(12) United States Patent
Zhang et al.

(10) Patent No.: US 11,449,576 B2
(45) Date of Patent: Sep. 20, 2022

(54) CONVOLUTION OPERATION PROCESSING METHOD AND RELATED PRODUCT

(71) Applicant: Tencent Technology (Shenzhen) Company Limited, Shenzhen (CN)

(72) Inventors: Heng Zhang, Shenzhen (CN); Yangming Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 403 days.

(21) Appl. No.: 16/678,004

(22) Filed: Nov. 8, 2019

(65) Prior Publication Data

US 2020/0074288 A1 Mar. 5, 2020

Related U.S. Application Data

(63) Continuation of application No. PCT/CN2018/116086, filed on Nov. 19, 2018.

(30) Foreign Application Priority Data

Dec. 6, 2017 (CN) .......................... 201711283173.9

(51) Int. Cl.
*G06F 17/15* (2006.01)
*G06N 3/04* (2006.01)
*G06N 3/063* (2006.01)

(52) U.S. Cl.
CPC .............. *G06F 17/15* (2013.01); *G06N 3/04* (2013.01); *G06N 3/063* (2013.01)

(58) Field of Classification Search
CPC .................................. G06N 3/063; G06N 3/04
See application file for complete search history.

(56) References Cited

U.S. PATENT DOCUMENTS

2011/0138157 A1* 6/2011 Ni ..................... G06F 30/00
712/225
2018/0267898 A1* 9/2018 Henry ............... G06F 12/0897
(Continued)

FOREIGN PATENT DOCUMENTS

CN 1987928 A 6/2007
CN 104915322 A 9/2015
(Continued)

OTHER PUBLICATIONS

Office Action issued on Chinese application No. 201711283173.9 dated Apr. 6, 2021, 10 pages.
(Continued)

*Primary Examiner* — Michael D. Yaary
(74) *Attorney, Agent, or Firm* — Crowell & Moring LLP

(57) ABSTRACT

Embodiments of this application provide a convolution operation processing method and a related product. The integrated chip includes a control unit, at least one convolutional processing element, an input cache, and an output cache. The control unit loads a sectioned convolution kernel and sectioned convolution input data into the input cache, the sectioned convolution kernel being generated by sectioning a convolution kernel and including a plurality of convolution kernel segments, and the sectioned convolution input data being generated by sectioning convolution input data and including a plurality of convolution input data segments; and the at least one convolutional processing element performs a sectioned convolution operation on the sectioned convolution kernel and the sectioned convolution input data to obtain a sectioned convolution result, and stores the sectioned convolution result into the output cache.

19 Claims, 11 Drawing Sheets

Load a sectioned convolution kernel and sectioned convolution input data into an input cache, the sectioned convolution kernel being data obtained by sectioning a convolution kernel, and the sectioned convolution input data being data obtained by sectioning convolution input data — 601

Perform a sectioned convolution operation on the sectioned convolution kernel and the sectioned convolution input data to obtain a sectioned convolution result, and store the sectioned convolution result into an output cache — 602

(56) References Cited

U.S. PATENT DOCUMENTS

2019/0266485 A1* 8/2019 Singh .................. G06N 3/0454
2021/0350205 A1* 11/2021 Yan ..................... G06N 3/0454

FOREIGN PATENT DOCUMENTS

| CN | 105631094 A | 6/2016 |
| CN | 105681628 A | 6/2016 |
| CN | 106844294 A | 6/2017 |
| CN | 106951395 A | 7/2017 |
| CN | 107145939 A | 9/2017 |
| CN | 107239824 A | 10/2017 |
| CN | 107239829 A | 10/2017 |
| CN | 108304923 A | 7/2018 |

OTHER PUBLICATIONS

Office Action of Chinese Application 201711283173.9 dated Oct. 11, 2021, 11 pages.
Yue Chen, "Design and Implementation of a Fast Algorithm of Partition Convolution," *College of Jincheng, Nanjing, University of Aeronautics and Astronautices*, Nanjing, pp. 1-3 (Abstract).
International Search Report and Written Opinion dated Dec. 6, 2017 for PCT Application No. PCT/CN2018/116086 (Chinese language only) (11 pp.).

\* cited by examiner

CONVOLUTION OPERATION PROCESSING METHOD AND RELATED PRODUCT

RELATED APPLICATION

This application is a continuation application of and claims priority to PCT International Application No. PCT/CN2018/116086 entitled "CONVOLUTION OPERATION PROCESSING METHOD AND RELATED PRODUCTS" and filed with the China National Intellectual Property Administration on Nov. 19, 2018, which claims priority to China Patent Application No. 201711283173.9, filed with the Chinese Patent Office on Dec. 6, 2017 and entitled "CONVOLUTION OPERATION PROCESSING METHOD AND RELATED PRODUCT", which is incorporated herein by reference in their entireties.

FIELD OF THE TECHNOLOGY

This application relates to the field of computer technologies, and in particular, to a convolution operation processing method in neural networks and a related product.

BACKGROUND OF THE DISCLOSURE

Deep learning is a mainstream approach at present in the field of artificial intelligence. In deep learning, a convolutional neural network (CNN) becomes the most widely applied neural network currently due to its outstanding prediction accuracy in the field of image processing. Like other deep learning techniques, the CNN requires a large amount of computing resources. To improve computing efficiency of the CNN, computation in the CNN is generally performed by using an integrated chip. The core of CNN computing is a convolution operation. During a convolution operation, the integrated chip expands a convolution kernel into a convolution kernel matrix, expands convolution input data into a convolution input matrix, and performs matrix multiplication operation on one row of the convolution kernel matrix and one column of the convolution input matrix.

SUMMARY

Embodiments of this application disclose a convolution operation processing method and a related product, which can reduce the demand for the quantity of circuits.

An embodiment of this application provides an integrated chip, the integrated chip including: a control unit, a convolutional processing element, an input cache, and an output cache;

the control unit loading a sectioned convolution kernel and sectioned convolution input data into the input cache, the sectioned convolution kernel being data obtained by sectioning a convolution kernel, and the sectioned convolution input data being data obtained by sectioning convolution input data; and the convolutional processing element performing a sectioned convolution operation on the sectioned convolution kernel and the sectioned convolution input data to obtain a sectioned convolution result, and storing the sectioned convolution result into the output cache.

An embodiment of this application provides a convolution operation processing method, including:

loading a sectioned convolution kernel and sectioned convolution input data into an input cache, the sectioned convolution kernel being data obtained by sectioning a convolution kernel, and the sectioned convolution input data being data obtained by sectioning convolution input data; and performing a sectioned convolution operation on the sectioned convolution kernel and the sectioned convolution input data to obtain a sectioned convolution result, and storing the sectioned convolution result into an output cache.

An embodiment of this application provides a convolution operation processing apparatus, including a memory and a processor, the memory being configured to store program instructions, and the program instructions being suitable to be loaded by the processor; and the processor being configured to load the program instructions and perform the convolution operation processing method according to the second aspect of the embodiments of this application.

An embodiment of this application provides a storage medium, the storage medium storing multiple program instructions, and the program instructions being suitable to be loaded by a processor to perform the convolution operation processing method according to the embodiment of this application.

An embodiment of this application provides a computer program product, the computer program product including a non-transient computer readable storage medium storing a computer program, and the computer program being operable to cause a computer to perform the convolution operation processing method according to the embodiment of this application.

In the embodiments of this application, during a convolution operation, an integrated chip uses a sectioned convolution operation. A sectioned convolution operation is performed on a sectioned convolution kernel and sectioned convolution input data to obtain a sectioned convolution result. Because the sectioned convolution kernel is data obtained by sectioning a convolution kernel, and the sectioned convolution input data is obtained by sectioning convolution input data. The sectioned convolution kernel and the sectioned convolution data both become smaller, and the sectioned convolution operation can be implemented by using fewer circuits, thus reducing the quantity of circuits required for the convolution operation.

BRIEF DESCRIPTION OF THE DRAWINGS

To illustrate the technical solutions in the embodiments of this application more clearly, the following briefly introduces the accompanying drawings for the embodiments.

DESCRIPTION OF EMBODIMENTS

Figure 1A:
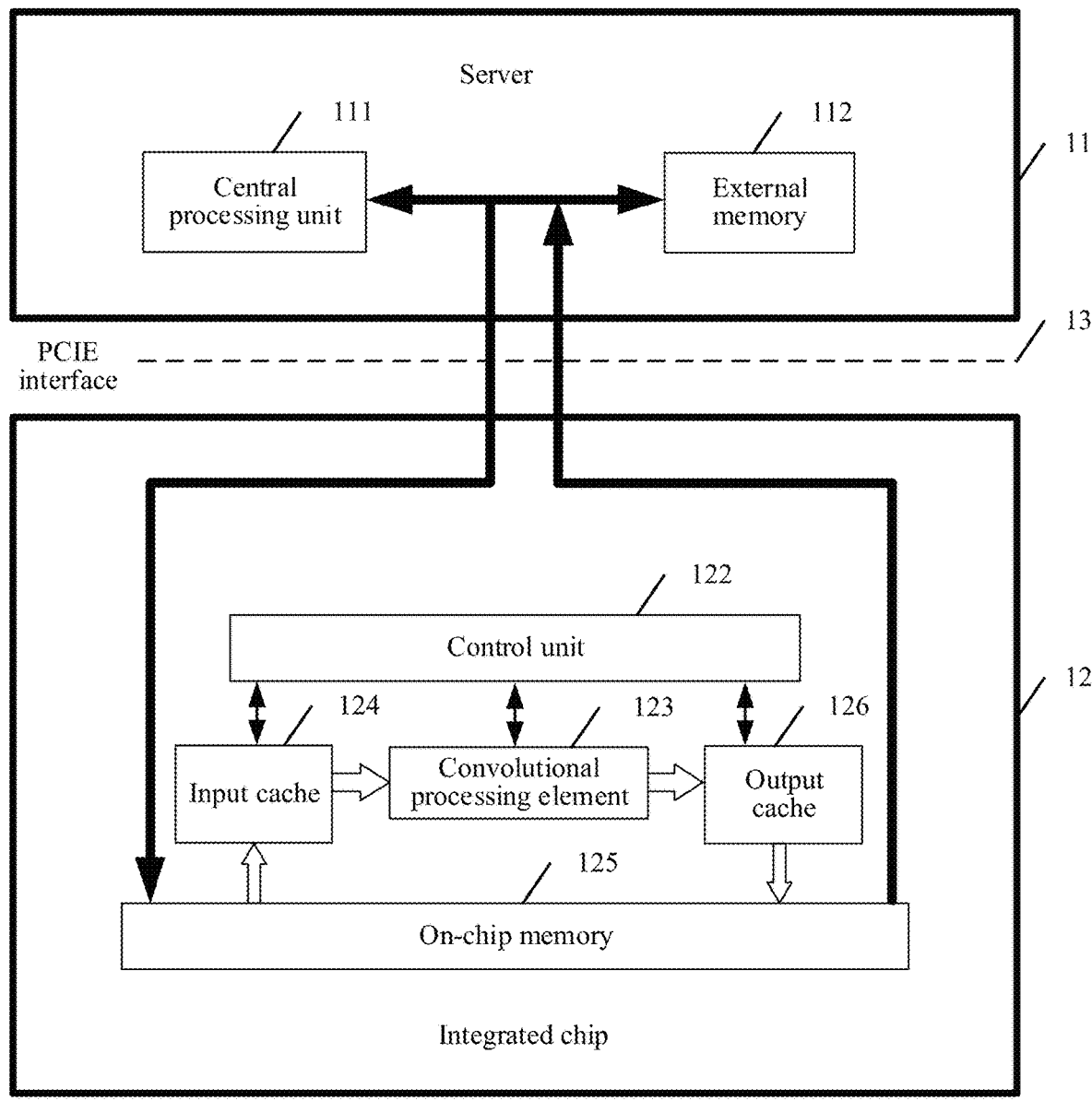
FIG. 1A is an exemplary schematic diagram of a hardware architecture according to an embodiment of this application.

The following describes the technical solutions in the embodiments of this application with reference to the accompanying drawings in the embodiments of this application. The described embodiments are merely examples of this application. Other embodiments obtained by a person of ordinary skill in the art based on the embodiments of this application without creative efforts shall fall within the protection scope of this application.

The embodiments of this application provide a convolution operation processing method and apparatus. A convolution kernel and convolution input data are sectioned (segmented, or processed in stages), so that a bandwidth required between a memory and an input cache can be reduced during a convolution operation.

The convolution operation processing method in the embodiment of this application may be performed by various computing platforms. The computing platform may be a computing platform in which operations are purely performed by a central processor unit (CPU), or a heterogeneous computing platform including a processor and an integrated chip (or a co-processor). In the computing platform in which operations are purely performed by the CPU, convolution operations may be performed by the CPU. In the heterogeneous computing platform, a controller of the computing platform may control the integrated chip (such as a field programmable gate array (FPGA) or an application specific integrated circuit (ASIC)) or a Graphics Processing Unit to perform matrix multiplication operations required by a convolutional neural network algorithm, or may control the integrated chip to also perform other operations of the convolutional neural network algorithm, for example, an activation function, pooling function, and normalization computing function. The convolution operation processing method according to various embodiments may include the following operations:

loading sectioned convolution kernels and sectioned convolution input data into an input cache, the sectioned convolution kernels being data obtained by sectioning a convolution kernel, and the sectioned convolution input data being data obtained by sectioning convolution input data; and performing a sectioned convolution operation on the sectioned convolution kernels and the sectioned convolution input data to obtain a sectioned convolution result, and storing the sectioned convolution result into an output cache.

By sectioning a convolution kernel, data volumes of convolution kernel data and input data used in each convolution operation can be reduced, thus reducing the size of an input cache of an integrated chip, and reducing a device bandwidth requirement and an input cache requirement of a convolutional neural network algorithm.

In various embodiments, the computing platform may determine a data volume of the sectioned convolution kernels according to a size of the input cache. For example, in a computing platform with limited memory resources, the size of the input cache for performing convolution operations may be determined and allocated according to memory usage; then, the size of the sectioned convolution kernels is determined according to the size of the allocated input cache. The convolution kernels may then be sectioned according to the size of the sectioned convolution kernels. In addition, the foregoing method may further include the following operations:

obtaining a convolution kernel, the convolution kernel including a plurality of convolution elements arranged in an N-dimensional space, and N being a positive integer; and segmenting the convolution kernel in the N-dimensional space according to a size of the input cache, to obtain a plurality of sectioned convolution kernels, where each sectioned convolution kernel includes a plurality of adjacent convolution elements in the N-dimensional space, and a data volume of each sectioned convolution kernel is smaller than the size of the input cache.

By determining the size of the sectioned convolution kernel according to the size of the cache, the size of the sectioned convolution kernel can be adjusted according to actual cache allocation, so that convolution computing is adaptive to the actual cache availability of the computing platform.

The size of the sectioned convolution kernel may also be related to the quantity of multiplication operation resources (such as multiplication operation units and multiplication operation circuits) that can be used for the convolution operation in the computing platform. In some embodiments, the convolution kernel may be segmented according to the following method:

obtaining a quantity of preset multiplication operation units for the sectioned convolution operation, and determining a first quantity of convolution elements in each sectioned convolution kernel according to the quantity of multiplication operation units;

obtaining a size of the input cache, and determining a second quantity of convolution elements in each sectioned convolution kernel according to the size of the input cache; and segmenting the convolution kernel in the N-dimensional space to obtain a plurality of sectioned convolution kernels, where a quantity of convolution elements in each sectioned convolution kernel is a smaller value of the first quantity and the second quantity.

Operation resources and cache resources are considered in a combined manner during sectioning of the convolution kernel, so that the convolution computing is adaptive to both the operation resources and the cache resources in the computing platform. Therefore, the technical solution can be applied to computing platforms that are sensitive to consumption of operation resources and cache resources.

In some embodiments, sectioning of the convolution kernel may be performed according to the following method:

determining a first direction of the convolution input data with a minimum quantity of data elements among N directions of the N-dimensional space; and segmenting the convolution kernel along the first direction, to obtain the plurality of sectioned convolution kernels.

By segmenting the convolution kernel along the direction of a dimension with minimum data elements in the convolution input data, a data transmission quantity during a convolution operation process can be reduced, thus reducing a read and write bandwidth.

In some embodiments, the input cache may be configured to temporarily store required sectioned convolution kernels and sectioned convolution input data. When the computing platform performs convolution operations of multiple sectioned convolution kernels with respect to the same sectioned convolution data in parallel, an independent cache space may be allocated to a convolution operation of each sectioned convolution kernel, or a shared cache space may be allocated to convolution operations of the parallel sectioned convolution kernels.

After the sectioned convolution kernel is obtained, the convolution input data may be sectioned according to information of the sectioned convolution kernel to obtain sectioned convolution input data. For example, the method according the embodiments may further include:

obtaining convolution input data, the convolution input data including a plurality of data elements arranged in an N-dimensional space, and N being a positive integer;

sectioning the convolution input data to obtain a plurality of pieces of sectioned convolution input data, where a quantity of data elements in each piece of sectioned convolution input data and an arrangement manner of the data elements in the N-dimensional space are the same as the quantity and the arrangement manner of convolution elements in each sectioned convolution kernel, and the plurality of pieces of sectioned convolution input data includes a group of sectioned convolution input data corresponding to each sectioned convolution kernel in the sectioned convolution kernels respectively;

loading, into the input cache, a first sectioned convolution kernel in the sectioned convolution kernels and first sectioned convolution input data in a first group of sectioned convolution input data corresponding to the first sectioned convolution kernel; and loading second sectioned convolution input data in the first group of sectioned convolution input data into the input cache to replace the first sectioned convolution input data after the convolutional processing element performs a sectioned convolution operation on the first sectioned convolution input data and the first sectioned convolution kernel, so that the convolutional processing element performs a sectioned convolution operation on the second sectioned convolution input data and the first sectioned convolution kernel.

In some embodiments, a plurality of sectioned convolution operations may be performed in parallel in the computing platform:

loading the first sectioned convolution input data in the plurality of pieces of sectioned convolution input data into an input cache corresponding to each convolutional processing element, and loading a plurality of first sectioned convolution kernels corresponding to the first sectioned convolution input data into the input cache corresponding to each convolutional processing element, so that each convolutional processing element performs a convolution operation on the first sectioned convolution input data and the respective first sectioned convolution kernel.

When convolution operations of a plurality of parallel sectioned convolution kernels share an input cache space, the sectioned convolution input data is respectively loaded into an input cache corresponding to each sectioned convolution operation, which is actually loading the sectioned convolution input data into a shared input cache.

By performing convolution operations of multiple sectioned convolution kernels in parallel with respect to the same piece of sectioned convolution input data when a plurality of sectioned convolution operations is performed in parallel, repeated interactions of data can be reduced, thus implementing parallel efficient convolution operations.

In some embodiments, after the convolution operation of the current sectioned convolution input data is completed, only a part, which is different from the currently cached sectioned convolution input data, of a next piece of sectioned convolution input data may be loaded into the input cache, thus further reducing loading of data and improving efficiency. For example, a part, which is different from the first sectioned convolution input data, of the second sectioned convolution input data in the plurality of pieces of sectioned convolution input data may be loaded into the input cache, so as to form the second sectioned convolution input data in the input cache.

In some embodiments, convolution operations of multiple sectioned convolution kernels corresponding to the same group of sectioned convolution input data may be performed in parallel by multiple convolution circuits, or may be performed in different batches by one or a plurality of convolution circuits. Results of the sectioned convolutions may be directly superimposed in the output cache, thus further saving space of the output cache. Herein, the same group of sectioned convolution input data refers to data elements in the same row or several rows in an input data matrix, for example, data corresponding to one row or several rows of pixels in an image. A plurality of sectioned convolution kernels corresponding to the same group of sectioned convolution input data may be a plurality of sectioned convolution kernels corresponding to the same column or several columns in a convolution kernel matrix. For example, the method according to the embodiments may further include:

loading, into the input cache, a second sectioned convolution kernel in the sectioned convolution kernels and third sectioned convolution input data in a second group of sectioned convolution input data corresponding to the second sectioned convolution kernel after the convolutional processing element completes a sectioned convolution operation on the first sectioned convolution kernel and the first group of sectioned convolution input data, so that the convolutional processing element performs a sectioned convolution operation on the second sectioned convolution kernel and the third sectioned convolution input data;

where the convolutional processing element is configured to: superimpose a sectioned convolution result of the second sectioned convolution kernel and the third sectioned convolution input data onto a second sectioned convolution result stored in the output cache, the second sectioned convolution result being a sectioned convolution result corresponding to data elements in the same row of the convolution input data.

In some embodiments, when a sectioned convolution kernel in the input cache is replaced, it is also possible to load a part, which is different from the sectioned convolution kernel currently stored in the input cache, of a new sectioned convolution kernel into the input cache, thus reducing a data transmission quantity. That is, in the foregoing method, a part, which is different from the first sectioned convolution kernel, of the second sectioned convolution kernel may be loaded into the input cache to form the second sectioned convolution kernel.

In some embodiments, when the computing platform includes an on-chip memory (that is, a microprocessor, for example, an on-chip memory such as a CPU or an FPGA), convolution input data required for a plurality of convolution operations may be temporarily stored in the on-chip memory, to reduce the number of interactions between the processor and an external memory. In this case, the method may include: extracting, from original convolution input data stored in an off-chip memory, data for performing a plurality of convolution operations as the convolution input data, and loading the convolution input data into an on-chip memory embedded in the computing platform.

In some embodiments, after the convolution operation of the current sectioned convolution input data is completed, only a part, which is different from the sectioned convolution input data currently stored in the on-chip memory, of a next piece of sectioned convolution input data may be loaded into the on-chip memory, thus further reducing a data interaction quantity and improving efficiency. In this case, the method may include: extracting, from the original convolution input data, second data for performing a plurality of convolution operations, loading a part, which is different from the convolution input data currently stored in the on-chip memory, of the second data into the on-chip memory to form the second data, and using the second data in the on-chip memory as the convolution input data for convolution operations.

In some embodiments, before the convolution operation of the current sectioned convolution input data is completed, a part, which is different from the sectioned convolution input data currently stored in the on-chip memory, of a next piece of sectioned convolution input data may be loaded into the on-chip memory first, thus reducing a waiting time for data loading and improving processing efficiency. In this case, the method may include: extracting, from the original convolution input data stored, second data for performing a plurality of convolution operations and loading a part, which is different from the convolution input data currently stored in the on-chip memory, of the second data into the on-chip memory to form the second data, before the convolution operation on a convolution input data currently stored in the on-chip memory is finished; and using the second data in the on-chip memory as the convolution input data for convolution operations after the convolution operation on the convolution input data currently stored in the on-chip memory is finished.

When the method according to the embodiments is implemented in a heterogeneous computing platform, a controller of the computing platform may control an integrated chip (for example, an FPGA/ASIC) to perform matrix multiplication operations required by a convolutional neural network algorithm. The controller of the computing platform may section the convolution kernel and the convolution input data, and load the convolution kernel and the convolution input data into the integrated chip at an appropriate time, that is, perform the method according to the foregoing embodiments, thus implementing the convolution operation.

In some embodiments, the heterogeneous computing platform may be as shown in FIG. 1A. FIG. 1A is a schematic diagram of a hardware architecture according to an embodiment of this application. As shown in FIG. 1A, the hardware architecture includes a server 11 and an integrated chip 12. The server 11 includes a central processing unit (CPU) 111 and an external memory 112. The server 11 and the integrated chip 12 are connected through a bus such as a Peripheral Component Interconnect Express (PCIE) interface 13. The integrated chip 12 may include a control unit 122, a convolutional processing element 123, an input cache 124, an on-chip memory 125, and an output cache 126. The control unit 122 and the convolutional processing element 123 are connected bi-directionally. The input cache 124 and the output cache 126 are connected bi-directionally to the control unit 122. The on-chip memory 125 is connected to the input cache 124, and the on-chip memory 125 may input data to the input cache 124. The input cache 124 is connected to the convolutional processing element 123, and the input cache 124 may input data to the convolutional processing element 123. The convolutional processing element 123 is connected to the output cache 126, and the convolutional processing element 123 may output data to the output cache 126. The output cache 126 is connected to the on-chip memory 125, and the output cache 126 may output data to the on-chip memory 125.

In the embodiment of this application, the integrated chip 12 may be a field programmable gate array (FPGA) or an application specific integrated circuit (ASIC). The integrated chip 12 serves as a co-processor of the server 11, and is configured to obtain data from the external memory 112 of the server 11, store the obtained data into the on-chip memory 125, and inform the control unit 122 that the data has been obtained from the external memory 112. The control unit 122 is configured to control the input cache 124 to obtain data to be processed from the on-chip memory 125. The convolutional processing element 123 performs computing on the data to be processed. The convolutional processing element 123 is configured to store a computation result obtained after the computation into the output cache 126. The output cache 126 is configured to output the computation result to the on-chip memory 125. The server 11 may read the computation result from the on-chip memory 125 of the integrated chip 12.

Figure 1B:
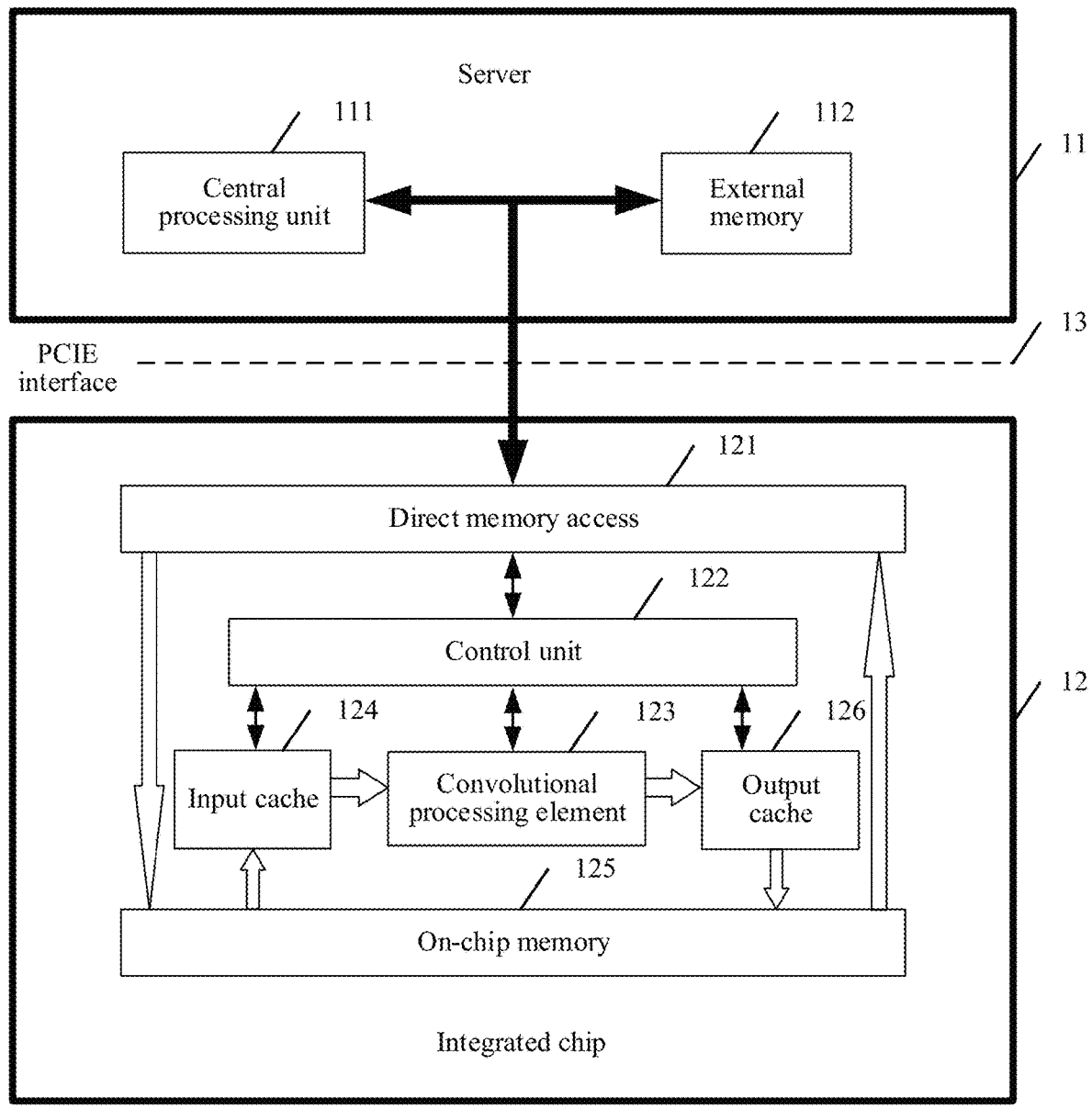
FIG. 1B is an exemplary schematic diagram of another hardware architecture according to an embodiment of this application.

Referring to FIG. 1B, FIG. 1B is a schematic diagram of another hardware architecture according to an embodiment of this application. FIG. 1B is obtained by further improvement based on FIG. 1A, and is different from FIG. 1A in that, a direct memory access (DMA) 121 is added to the integrated chip 12. The direct memory access 121 is connected to the control unit 122 and the on-chip memory 125 bi-directionally. The integrated chip 12 may obtain data from the external memory 112 of the server 11 through the direct memory access 121. The direct memory access 121 is configured to store the obtained data into the on-chip memory 125 and inform the control unit 122 that the data has been obtained from the external memory 112. The server 11 may further read a computation result from the on-chip memory 125 of the integrated chip 12 through the direct memory access 121.

After the direct memory access 121 is used in FIG. 1B, the control unit 122 and the convolutional processing element 123 do not need to be interrupted when the direct memory access 121 reads data from the server 11. By using the direct memory access 121, efficiency of data transmission between the integrated chip 12 and the server 11 can be improved.

Figure 1C:
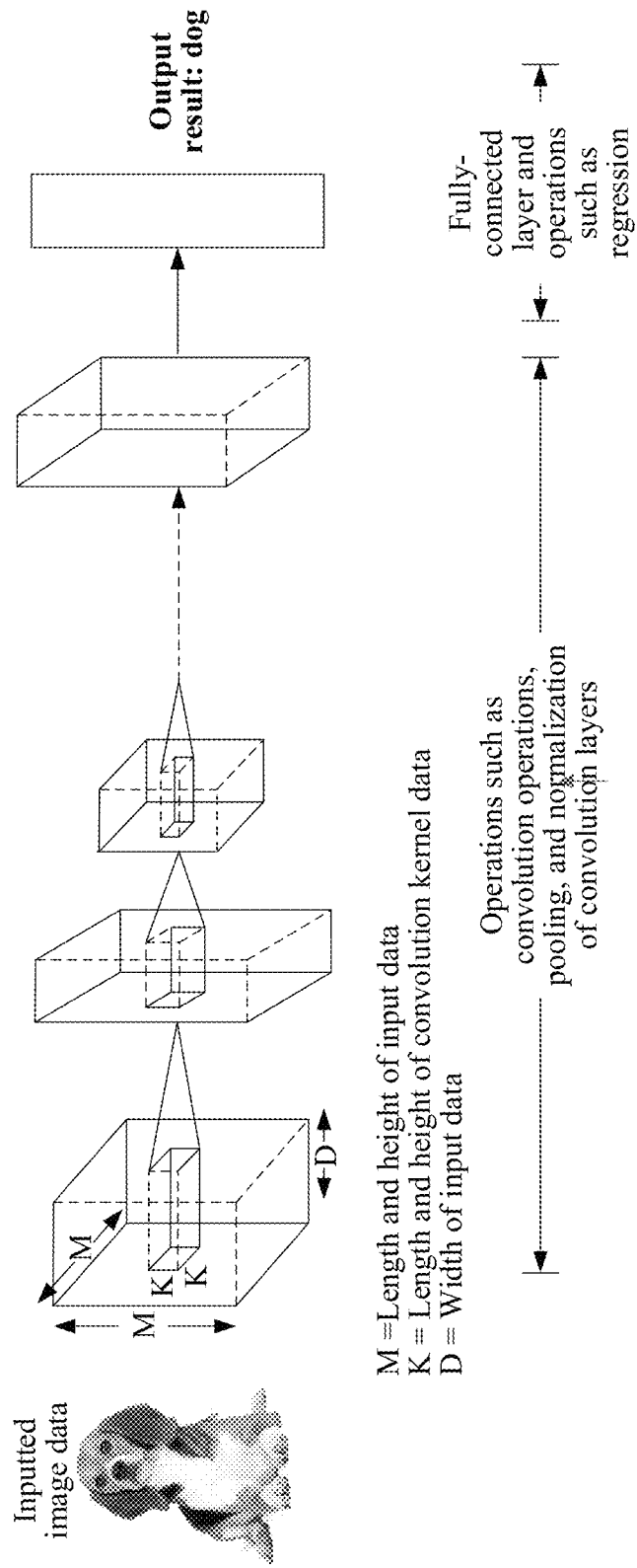
FIG. 1C is an exemplary schematic diagram of a convolutional neural network model according to an embodiment of this application.

Referring to FIG. 1C, FIG. 1C is a schematic diagram of a convolutional neural network algorithm model according to an embodiment of this application. As shown in FIG. 1C, the convolutional neural network algorithm model may process image data for an image classification application. Inputted image data is subjected to operations such as a convolution operation, pooling, and normalization. Finally, after processing by a fully-connected layer and a regression (softmax) operation, an image processing result (an image class) is outputted, for example, classifying the image as a "dog". In the whole computing process of the convolutional neural network algorithm, the convolution operation may include multiple layers of computing, and the convolution operation consumes the largest computing resources in the whole computing process of the convolutional neural network algorithm. The convolutional neural network algorithm in the embodiment of this application may be used for object recognition of various images, to provide image classification and image filtering. For example, a service scenario to which the embodiment of this application is applicable may be a target service scenario of pornographic picture detection and filtering. The convolution operation in the embodiment of this application may be implemented through a deep learning platform. The deep learning platform may include a convolutional neural network architecture (such as Convolutional Architecture for Fast Feature Embedding (Caffe)), a second-generation artificial intelligence learning system (such as Tensor Flow), and the like. The deep learning platform may invoke Basic Linear Algebra Subprograms (BLAS) to perform a matrix multiplication operation.

In the hardware architecture shown in FIG. 1A and FIG. 1B, the convolutional processing element 123 in the integrated chip 12 may be configured to process a convolution operation. There may be multiple convolutional processing elements 123, which can process multiple convolution operations in parallel and at the same time.

In a convolutional neural network, a convolution operation means a convolution operation performed between a convolution kernel and convolution input data. The quantity of convolution kernels and the size of the convolution kernel are related to the convolutional neural network algorithm. Generally, for the same convolutional neural network algorithm, the convolution operation of each layer involves different convolution kernels, and the convolution operation of each layer also involves different convolution input data. In some implementations, to facilitate the logic circuits to perform a convolution operation on the convolution input data and the convolution kernels, the convolution input data may be directly expanded into a convolution input matrix, the convolution kernel may be directly expanded into a convolution kernel matrix, and the convolution operation is converted into a matrix multiplication operation (a multiplication operation and an additive operation) that can be implemented by the logic circuits. During the matrix multiplication operation, one row of the convolution kernel matrix and one column of the convolution input matrix are read from the on-chip memory 125 into the input cache 124, and the convolutional processing element 123 performs a matrix multiplication operation on the one row of the convolution kernel matrix and the one column of the convolution input matrix. Because the convolution input matrix generally has a large data volume, the matrix multiplication operation involves an extremely large data volume and computing resource requirement. Therefore, a tremendous quantity of logic circuits of the integrated chip 12 is needed for performing the matrix multiplication operation. The logic circuit may include at least one of a multiplier, an adder, and a multiplier-adder. In addition, during a matrix multiplication operation between the convolution kernel matrix and the convolution input matrix, because the matrix multiplication operation needs to be performed between each row of the convolution kernel matrix and each column of the convolution input matrix, data of the convolution input matrix is read repeatedly, and therefore a high bandwidth is required between the on-chip memory 125 and the input cache 124.

Figure 2A:
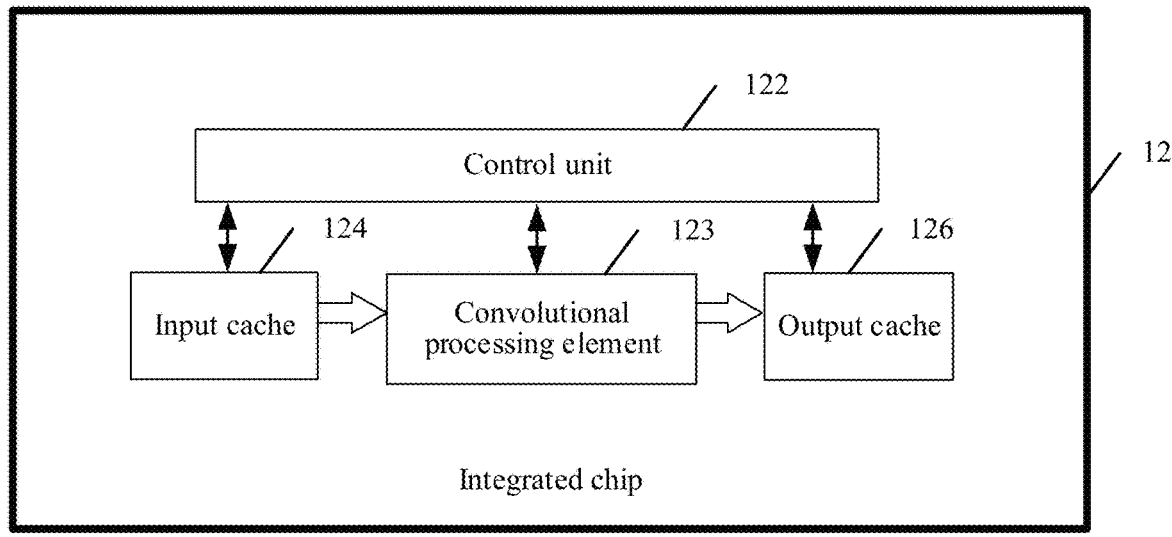
FIG. 2A is an exemplary schematic structural diagram of an integrated chip according to an embodiment of this application.

Based on the hardware architecture shown in FIG. 1A and the convolutional neural network algorithm model shown in FIG. 1C, an integrated chip is provided. Referring to FIG. 2A, FIG. 2A is a schematic structural diagram of an integrated chip according to an embodiment of this application. As shown in FIG. 2A, the integrated chip 12 includes a control unit 122, a convolutional processing element 123, an input cache 124, and an output cache 126.

In some embodiments, the integrated chip 12, based on the hardware architecture shown in FIG. 1B, may further include a direct memory access 121. The direct memory access 121 and the control unit 122 may be connected bi-directionally. The control unit 122 and the convolutional processing element 123 do not need to be interrupted when the direct memory access 121 reads data from an external device of the integrated chip. By using the direct memory access 121, efficiency of data transmission between the integrated chip 12 and the external device can be improved.

In the process of the convolution operation, the quantity of convolution layers of the convolution operation as well as the size and quantity of convolution kernels for the convolution operation of each layer are related to the convolutional neural network algorithm. For different convolutional neural network algorithms, the quantity of convolution layers that require convolution operations is not necessarily the same, the size of the convolution kernel for the convolution operation of each layer is not necessarily the same, the quantity of convolution kernels for the convolution operation of each layer is not necessarily the same, and whether or not a post-processing operation is required for the convolution operation of each layer is not necessarily determinant. The post-processing operation includes at least one of activation function computing, pooling computing, and normalization computing, and whether or not the post-processing computing is performed is determined according to the convolutional neural network algorithm. In a case of a predetermined convolutional neural network algorithm, the quantity of layers of the convolution operation as well as the size and quantity of convolution kernels for the convolution operation of each layer are determinant. In a process of a multi-layer convolution operation, the convolution operation is performed layer by layer. First, a first-layer convolution operation is performed. After a first-layer convolution operation result is obtained, post-processing computing is performed if the neural network algorithm requires post-processing computing. A result obtained after the post-processing computing is performed on the first-layer convolution operation result is used as convolution input data of a second-layer convolution operation. If the neural network algorithm does not require post-processing computing, the first-layer convolution operation result is used directly as convolution input data of the second-layer convolution operation. Then, the second-layer convolution operation is performed, and so on, until a last-layer convolution operation is performed, thus completing the multi-layer convolution operation. In the process of the convolution operation of one layer, if there are N convolution kernels, convolution operations may be performed between the N convolution kernels and the convolution input data respectively. The convolution kernel may be learned from training data through training process. The convolution input data of the first-layer convolution operation may be initial data for the convolution operation. For example, the initial data may be the input image data to be processed. In the foregoing multi-layer convolution operation, the result of the convolution operation of each layer may be used as convolution input data of a next layer after a re-arrangement operation. In a case that a matrix is used as convolution operation input, re-arrangement may be generally implemented by using a transposing operation.

In the embodiment of this application, the convolution kernel and the convolution input data may be three-dimensional. The convolution kernel and the convolution input data may be construed as three-dimensional data blocks. A convolution result obtained after a convolution operation is performed between one convolution kernel and the convolution input data may be two-dimensional. Because there are usually multiple convolution kernels, a result of convolution operations performed between multiple convolution kernels and the convolution input data are three-dimensional.

The convolution operation between the convolution kernel and the convolution input data may be construed as follows: a small data block corresponding to the convolution kernel slides in a big data block corresponding to the convolution input data; each time the small data block is slid, a multiplication operation is performed between the small data block and a part of data that corresponds to the small data block in big data block; and results of multiplication between every two pieces of overlapping data are added together to obtain a convolution result.

Figure 3:
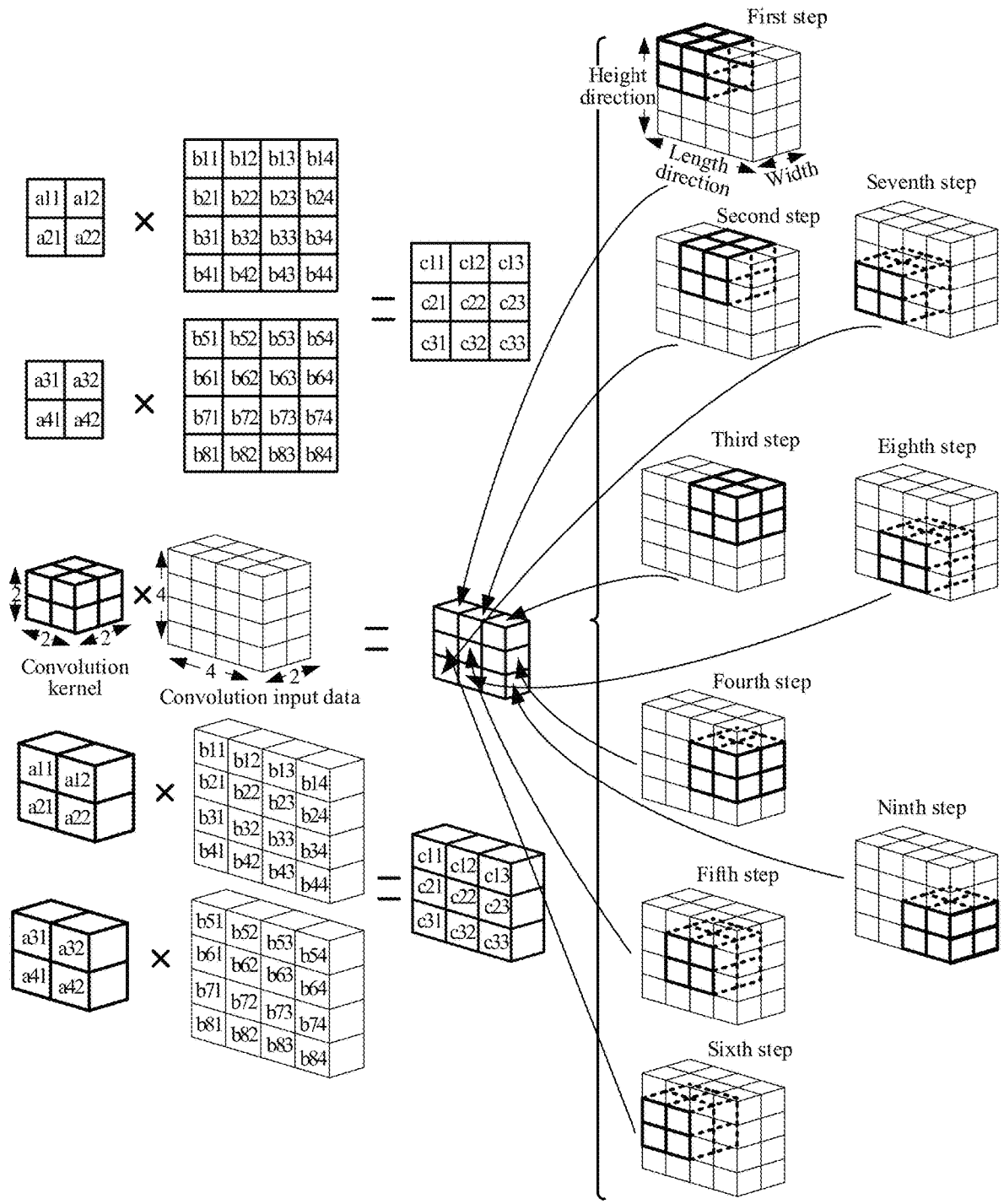
FIG. 3 is an exemplary schematic diagram of a computing process of a conventional convolution operation according to an embodiment of this application.

For ease of understanding of the convolution operation, a specific process of the convolution operation is illustrated by using FIG. 3 as an example. FIG. 3 is a schematic diagram of a computing process of a convolution operation according to an embodiment of this application. As shown in FIG. 3, the convolution kernel is a 2×2×2 data block, where the length, height, and width of the convolution kernel are all 2. The convolution kernel includes a total of 8 pieces of data (a11, a12, a21, a22, a31, a32, a41, a42). The convolution kernel includes 8 small cubes, and each cube represents a piece of data in the convolution kernel. The convolution input data is a 4×4×2 data block, where the length and height of the convolution input data are both 4, and the width of the convolution input data is 2. The convolution input data includes a total of 32 pieces of data (b11, b12, b13, b14, b21, b22, b23, b24, b31, b32, b33, b34, b41, b42, b43, b44, b51, b52, b53, b54, b61, b62, b63, b64, b71, b72, b73, b74, b81, b82, b83, b84). The convolution input data includes 32 small cubes, and each small cube represents a piece of data in the convolution input data. Before the convolution operation is performed, the control unit 122 loads the convolution kernel and the convolution input data into the input cache 124. The control unit 122 may load the convolution kernel and the convolution input data into the input cache 124 in the following manner: the control unit 122 may transmit a read instruction to the input cache 124; the input cache 124 reads the convolution kernel and the convolution input data from the memory in response to the read instruction, and loads the convolution kernel and the convolution input data into the input cache 12.

From the perspective of the convolution operation, that the convolutional processing element 123 performs a convolution operation on the convolution kernel and the convolution input data may be specifically implemented as follows: In the first step, the convolutional processing element 123 associate the convolution kernel with the convolution input data, so that the data block of the convolution kernel overlaps with a 2×2×2 data block in the convolution input data, performs a multiplication operation on data represented by the overlapping small cubes to obtain a multiplication result, and adds up all multiplication results to obtain a convolution operation result of the first step. It can be seen from FIG. 3 that, in the first step, a11, a12, a21, a22, a31, a32, a41, and a42 overlap with b11, b12, b21, b22, b51, b52, b61, and b62 respectively, the convolution operation in the first step is:
a11×b11+a12×b12+a21×b21+a22×b22+a31×b51+a32×b52+a41×b61+a42×b62, and the convolution operation result of the first step is c11, where
c11=a11×b11+a12×b12+a21×b21+a22×b22+a31×b51+a32×b52+a41×b61+a42×b62. It can be seen that, the convolution operation in the first step may be construed as an element by element matrix multiplication operation (or a dot multiplication) performed between a one-row matrix formed by a11, a12, a21, a22, a31, a32, a41, and a42 and a one-column matrix formed by b11, b12, b21, b22, b51, b52, b61, and b62. In the second step, the convolution kernel is slid by one data unit along a length direction of the convolution input data, so that the data block of the convolution kernel overlaps with another 2×2×2 data block in the convolution input data. Similar to the first step, a multiplication operation is performed on data represented by the overlapping small cubes to obtain a multiplication result, and all multiplication results are added up to obtain a convolution operation result of the second step. It can be seen from FIG. 3 that, in the second step, a11, a12, a21, a22, a31, a32, a41, and a42 overlap with b12, b13, b22, b23, b52, b53, b62, and b63 respectively, and the convolution operation result of the second step is c12. In the third step, the convolution kernel is slid by one data unit along the length direction of the convolution input data, and a multiplication operation and an additive operation are performed on data represented by overlapping small cubes, to obtain a convolution operation result c13 of the third step. In the fourth step, the convolution kernel is slid by one data unit along a height direction of the convolution input data, and a multiplication operation and an additive operation are performed on data represented by overlapping small cubes, to obtain a convolution operation result c23 of the fourth step. In the fifth step, the convolution kernel is slid by one data unit along the length direction of the convolution input data, and a multiplication operation and an additive operation are performed on data represented by overlapping small cubes, to obtain a convolution operation result c22 of the fifth step. In the sixth step, the convolution kernel is slid by one data unit along the length direction of the convolution input data, and a multiplication operation and an additive operation are performed on data represented by overlapping small cubes, to obtain a convolution operation result c21 of the sixth step. In the seventh step, the convolution kernel is slid by one data unit along the height direction of the convolution input data, and a multiplication operation and an additive operation are performed on data represented by overlapping small cubes, to obtain a convolution operation result c31 of the seventh step. In the eighth step, the convolution kernel is slid by one data unit along the length direction of the convolution input data, and a multiplication operation and an additive operation are performed on data represented by overlapping small cubes, to obtain a convolution operation result c32 of the eighth step. In the ninth step, the convolution kernel is slid by one data unit along the length direction of the convolution input data, and a multiplication operation and an additive operation are performed on data represented by overlapping small cubes, to obtain a convolution operation result c33 of the ninth step. So far, the convolution operation between the convolution kernel and the convolution input data is completed, and a final convolution operation result is obtained. The final convolution result is formed by nine pieces of data: c11, c12, c13, c21, c22, c23, c31, c32, and c33, and the nine pieces of data may be mapped to a 3×3 data plane:
c11 c12 c13
c21 c22 c23. If there are N convolution kernels in FIG. 3, a convolution operation result
c31 c32 c33
between the N convolution kernels and the convolution input data is a 3×3×N data block (where the length and the height are both 3, and the width is N).

From the perspective of the matrix operation, that the convolutional processing element 123 performs a convolution operation on the convolution kernel and the convolution input data may be specifically implemented as follows: The convolutional processing element 123 converts the convolution kernel matrix into a convolution kernel matrix with 1 row and 8 columns, and converts the convolution input data into a convolution input matrix with 8 rows and 9 columns. The quantity of columns of the convolution input data is determined based on the size of the convolution kernel and the size of the convolution input data. If the size of the convolution kernel is K×K×D and the size of the convolution input data is M×M×D, the quantity of columns of the convolution input data is (M−K+1)×(M−K+1). A matrix operation is performed on the convolution kernel matrix with 1 row and 8 columns and the convolution input matrix with 8 rows and 9 columns, to obtain a matrix with 1 row and 9 columns. The matrix with 1 row and 9 columns may be mapped to a 3×3 data plane. If there are N convolution kernels in FIG. 3, a convolution operation result between the N convolution kernels and the convolution input data is a 3×3×N data block (where the length and the height are both 3, and the width is N).

For ease of understanding, the length, height and width of the convolution kernel and the convolution input data in FIG. 3 being small values is used as an example for description. However, in a practical convolution operation process, the length, height and width of the convolution kernel and the convolution input data are usually extremely large. To ensure that the integrated chip 12 is applicable to all convolution operations, the quantity of logic circuits for convolution operations in the integrated chip 12 is set to an extremely large value, and this causes a waste of circuits. Moreover, because there are multiple convolution kernels and each convolution kernel needs to perform a convolution operation with convolution input data, the convolution kernels or the convolution input data is repeatedly loaded from the memory into the input cache, thus requiring a high communication bandwidth requirement between the memory and the input cache.

The integrated chip 12 shown in FIG. 2A may section a convolution kernel to obtain sectioned convolution kernels, and section convolution input data to obtain sectioned convolution input data. After the sectioned convolution kernel and the sectioned convolution input data are loaded into the input cache 124, the convolutional processing element 123 performs a sectioned convolution operation on the sectioned convolution input data and the sectioned convolution kernel to obtain a sectioned convolution result, and stores the sectioned convolution result into the output cache 126. The sectioned convolution kernel is data obtained by sectioning the convolution kernel, and the sectioned convolution input data is obtained by sectioning the convolution input data. The foregoing process is a convolution operation of one layer, and in the convolution operation of a next layer, the foregoing sectioned convolution result is used as convolution input data of the convolution operation of the next layer. Refer to the foregoing description about the convolution operation for a specific convolution process, and details are not described herein again.

If the quantity of convolution kernels in the convolution operation of one layer is N, the sectioned convolution kernel may be obtained by sectioning a convolution kernel as follows: the sectioned convolution kernel includes a segment of data in the same spatial area obtained in each of the N convolution kernels according to the same sectioning manner.

The sectioned convolution input data may be obtained by sectioning convolution input data as follows: the sectioned convolution input data may include a segment of data in the convolution input data obtained according to the sectioning manner of the foregoing sectioned convolution kernel, where the segment of data can overlap with data of the sectioned convolution kernel by spatial area in the convolution operation process.

Figure 4A:
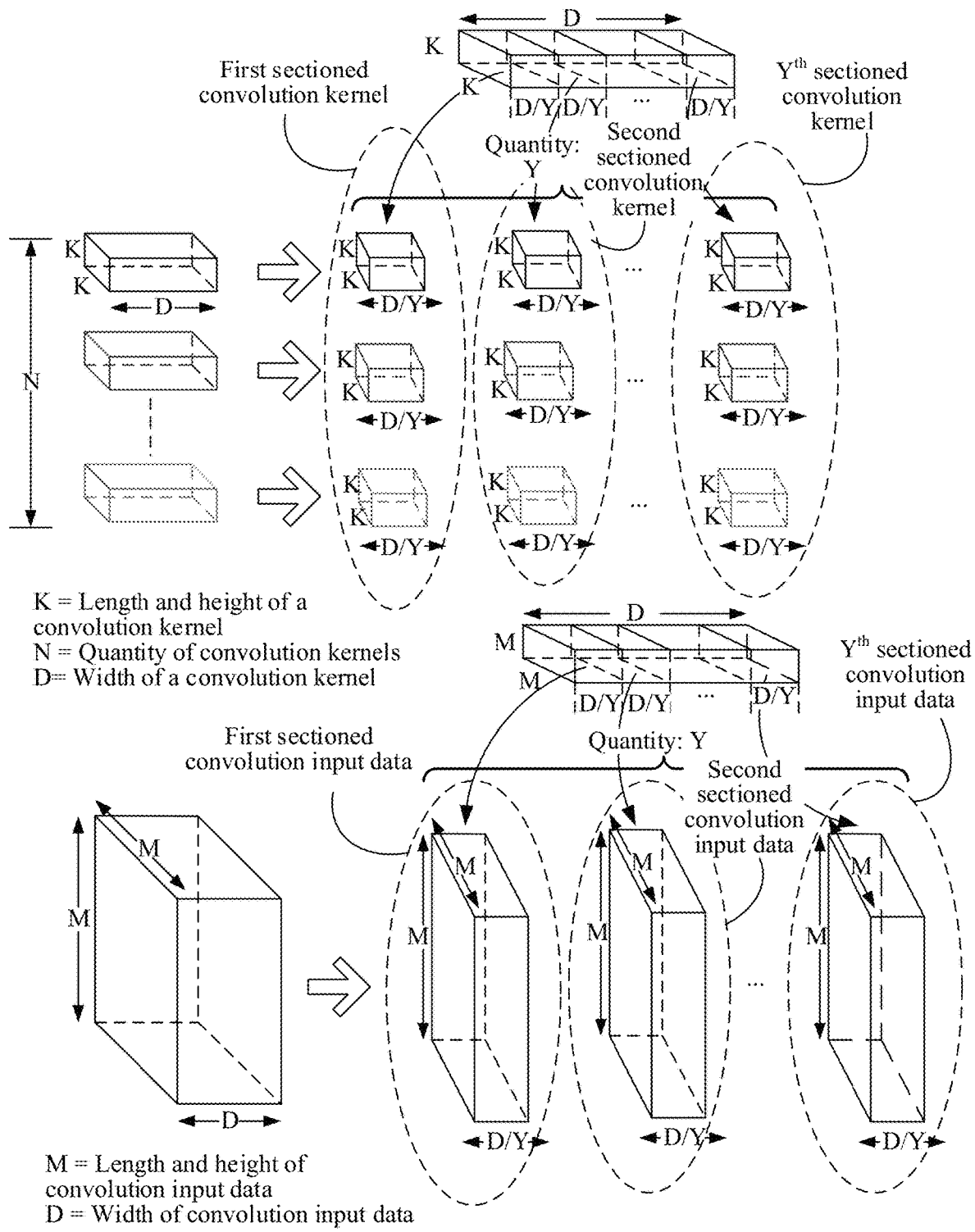
FIG. 4A is an exemplary schematic diagram for sectioning a processing of a convolution kernel and convolution input data according to an embodiment of this application.

The sectioning manner of the convolution kernel and the sectioning manner of the convolution input data are described by using FIG. 4A as an example. FIG. 4A is a schematic diagram of sectioning processing of a convolution kernel and a convolution input data according to an embodiment of this application. FIG. 4A shows a scenario of a convolution operation between N convolution kernels and one piece of convolution input data. Each convolution kernel has a size of K×K×D, where K is the length and height of the convolution kernel, and D is the width of the convolution kernel. The convolution input data has a size of M×M×D, where M is the length and height of the convolution input data, and D is the width of the convolution input data. The convolution kernel and the convolution input data each may be construed as a data block in a three-dimensional space. Each convolution kernel includes K×K×D pieces of data, and the convolution input data includes M×M×D pieces of data. During division of the convolution kernel, the K×K×D data block is divided along a width direction into Y sub-data blocks each with a size of K×K×(D/Y). Similarly, during division of the convolution input data, the M×M×D data block is also divided along a width direction into Y sub-data blocks each with a size of M×M×(D/Y). For example, during sectioning processing of N convolution kernels, sub-data blocks whose width is within an interval of 0 to D/Y of the N convolution kernels are used as a first sectioned convolution kernel, sub-data blocks whose width is within an interval of D/Y to 2D/Y of the N convolution kernels are used as a second sectioned convolution kernel . . . , and sub-data blocks whose width is within an interval of (Y−1)D/Y to D of the N convolution kernels are used as a $Y^{th}$ sectioned convolution kernel. During sectioning processing of convolution input data, a sub-data block whose width is within an interval of 0 to D/Y of the convolution input data is used as a first piece of sectioned convolution input data of the convolution input data, a sub-data block whose width is within an interval of D/Y to 2D/Y of the convolution input data is used as a second piece of sectioned convolution input data of the convolution input data . . . , and a sub-data block whose width is within an interval of (Y−1)D/Y to D of the convolution input data is used as a $Y^{th}$ piece of sectioned convolution input data of the convolution input data.

It can be seen from FIG. 4A that, the first sectioned convolution kernel includes a segment of data whose width is in the interval of 0 to D/Y obtained by sectioning each of the N convolution kernels along the width direction by using D/Y as a unit; the second sectioned convolution kernel includes a segment of data whose width is in the interval of D/Y to 2D/Y obtained by each of the N convolution kernels along the width direction by using D/Y as a unit; and the $Y^{th}$ sectioned convolution kernel includes a segment of data whose width is within the interval of (Y−1)D/Y to D obtained by each of the N convolution kernels along the width direction by using D/Y as a unit. Similarly, the first sectioned convolution input data is a segment of data whose width is in the interval of 0 to D/Y obtained by sectioning the convolution input data along the width direction by using D/Y as a unit; the second sectioned convolution input data is a segment of data whose width is in the interval of D/Y to 2D/Y by sectioning the convolution input data along the width direction by using D/Y as a unit; the $Y^{th}$ sectioned convolution input data is a segment of data whose width is in the interval of (Y−1)D/Y to D by sectioning the convolution input data along the width direction by using D/Y as a unit. The first sectioned convolution kernel corresponds to the first sectioned convolution input data, the second sectioned convolution kernel corresponds to the second sectioned convolution input data, and the $Y^{th}$ sectioned convolution kernel corresponds to the $Y^{th}$ sectioned convolution input data.

Before the sectioned convolution operation, the control unit 122 loads the first sectioned convolution kernel and the corresponding first sectioned convolution input data into the input cache 124. During the sectioned convolution operation, the convolutional processing element 123 performs a convolution operation on the first sectioned convolution kernel and the corresponding first sectioned convolution input data respectively, to obtain a sectioned convolution result of a first section, and stores the sectioned convolution result of the first section into the output cache 126. Similarly, the control unit 122 loads the second sectioned convolution kernel and the corresponding second sectioned convolution input data into the input cache 124. The convolutional processing element 123 performs a convolution operation on the second sectioned convolution kernel and the second sectioned convolution input data respectively, to obtain a sectioned convolution result of a second section, and stores the sectioned convolution result of the second section into the output cache 126. Likewise, the control unit 122 loads the $Y^{th}$ sectioned convolution kernel and the corresponding $Y^{th}$ sectioned convolution input data into the input cache 124. The convolutional processing element 123 performs a convolution operation on the $Y^{th}$ sectioned convolution kernel and the $Y^{th}$ sectioned convolution input data respectively, to obtain a sectioned convolution result of a $Y^{th}$ section, and stores the sectioned convolution result of the $Y^{th}$ section into the output cache 126.

Figure 4B:
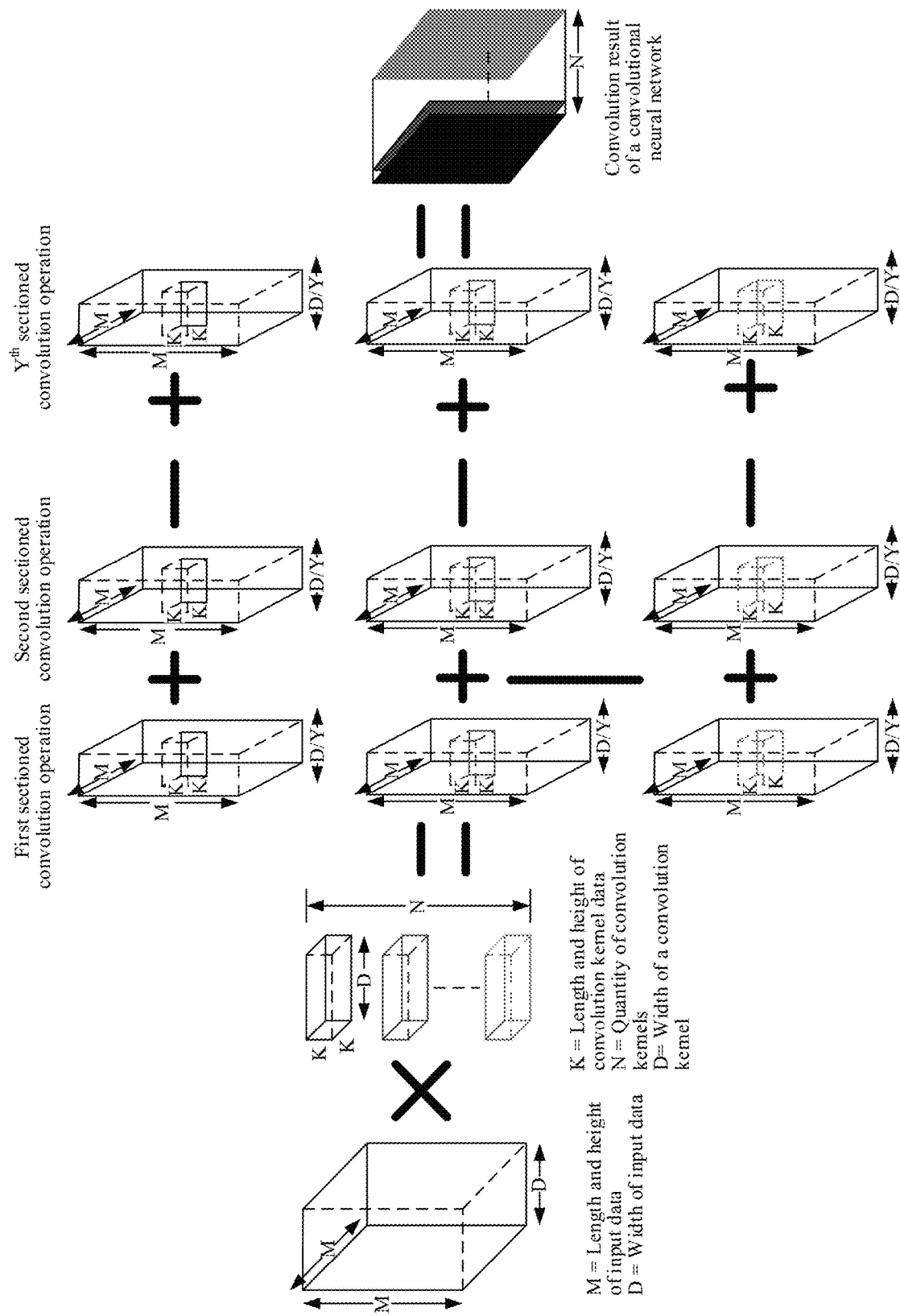
FIG. 4B is an exemplary schematic flowchart of a sectioned convolution operation according to an embodiment of this application.

The process of the sectioned convolution operation is illustrated below with reference to FIG. 4A and FIG. 4B. As shown in FIG. 4B, FIG. 4B shows a process of a convolution operation performed between N convolution kernels each with a size of K×K×D and convolution input data with a size of M×M×D. First, according to the manner shown in FIG. 4A, each convolution kernel is divided into Y sectioned convolution kernels each with a size of K×K×(D/Y), and the convolution input data is divided into Y pieces of sectioned convolution input data each with a size of M×M×(D/Y). Moreover, the first sectioned convolution kernel corresponds to the first sectioned convolution input data, the second sectioned convolution kernel corresponds to the second sectioned convolution input data, and the $Y^{th}$ sectioned convolution kernel corresponds to the $Y^{th}$ sectioned convolution input data. In FIG. 4B, the convolution operation may be divided into convolution operations of Y sections, and the convolution operations of the Y sections include: a first sectioned convolution operation, a second sectioned convolution operation . . . , and a $Y^{th}$ sectioned convolution operation. The first sectioned convolution operation in FIG. 4B is a convolution operation performed between the first sectioned convolution kernel and the first sectioned convolution input data; the second sectioned convolution operation in FIG. 4B is a convolution operation performed between the second sectioned convolution kernel and the second sectioned convolution input data . . . , the $Y^{th}$ sectioned convolution operation in FIG. 4B is a convolution operation performed between the $Y^{th}$ sectioned convolution kernel and the $Y^{th}$ sectioned convolution input data. After the convolution operations of the Y sections are completed, results of the convolution operations of the Y sections are accumulated, to obtain a final convolution result. A detailed process of the convolution operation between the K×K×(D/Y) sectioned convolution kernel and the M×M×(D/Y) sectioned convolution input data is similar to the convolution operation between the 2×2×2 convolution kernel and the 4×4×2 convolution input data in FIG. 3, and details are not described herein again.

Figure 4C:
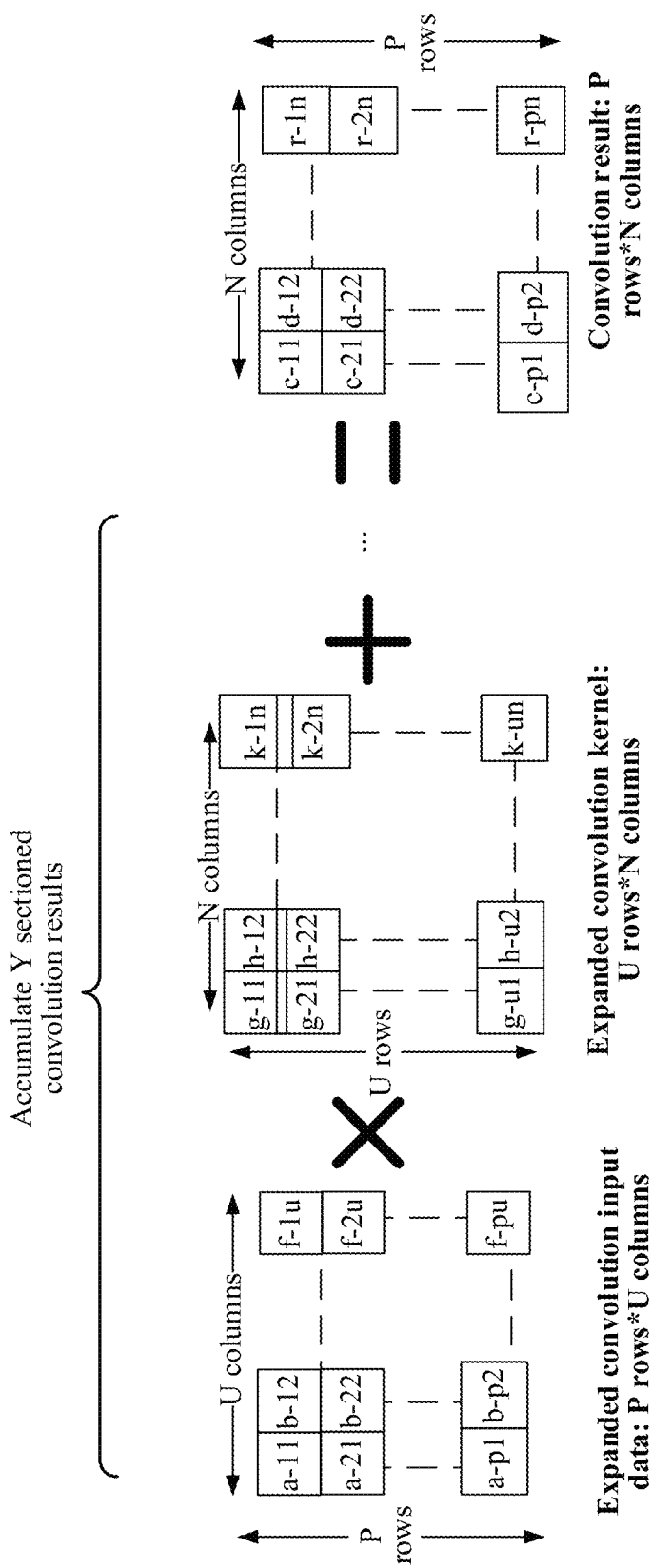
FIG. 4C is an exemplary schematic flowchart of a matrix multiplication operation corresponding to a sectioned convolution operation according to an embodiment of this application.

A matrix multiplication operation process corresponding to the convolution operation between the sectioned convolution kernel and the sectioned convolution input data in FIG. 4B is illustrated below with reference to FIG. 4C. As shown in FIG. 4C, the first sectioned convolution kernel may be expanded to be a matrix with U rows and N columns; the first sectioned convolution input data may be expanded to be a matrix with P rows and U columns. The second sectioned convolution kernel may also be expanded to be a matrix with U rows and N columns; the second sectioned convolution input data may also be expanded to be a matrix with P rows and U columns. Similarly, the $Y^{th}$ sectioned convolution kernel may also be expanded to be a matrix with U rows and N columns; the $Y^{th}$ sectioned convolution input data may also be expanded to be a matrix with P rows and U columns. Results of matrix multiplication operations performed on the Y matrices with P rows and U columns and the Y matrices with U rows and N columns respectively are accumulated, thus obtaining a convolution result with P rows and N columns, where U=K×K×(D/Y), and P=(M−K+1)×(M−K+1).

Figure 2B:
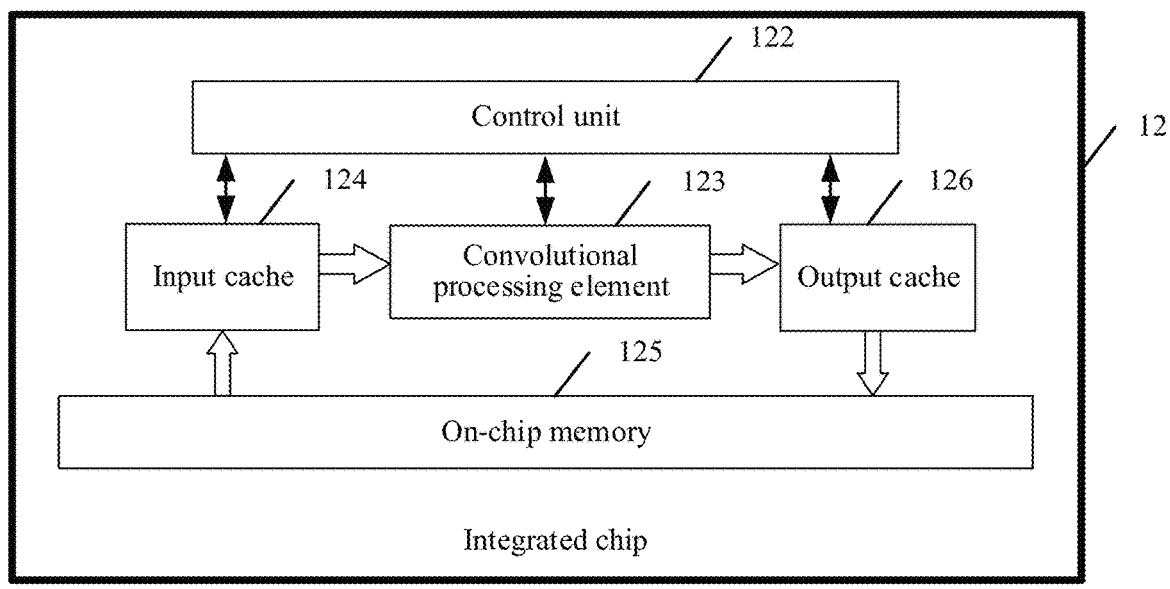
FIG. 2B is an exemplary schematic structural diagram of another integrated chip according to an embodiment of this application.

In some embodiments, as shown in FIG. 2B, the integrated chip 12 may further include an on-chip memory 125. The on-chip memory 125 receives the convolution input data and the sectioned convolution kernel, or the on-chip memory 125 receives the convolution input data and the convolution kernel. The on-chip memory 125 may be connected to the input cache 124, and may be connected to the output cache 126.

In the embodiment of this application, the convolution kernel may also be sectioned by the server 11 in FIG. 1A or FIG. 1B, or may be sectioned by the integrated chip 12. The convolution input data may be sectioned by the integrated chip 12.

If the convolution kernel is sectioned by the server 11 in FIG. 1A. The central processing unit 111 of the server 11 sections N convolution kernels of each layer corresponding to the convolutional neural network algorithm to obtain multiple sectioned convolution kernels, and stores the sectioned convolution kernels into the external memory 112.

The central processing unit 111 of the server 11 inputs multiple sectioned convolution kernels in the external memory 112 of the central processing unit 111 and convolution input data for convolution operations into the on-chip memory 125 of the integrated chip 12. The on-chip memory 125 may receive convolution input data and multiple sectioned convolution kernels transmitted by the server 11. The control unit 122 divides (or sections) the convolution input data in the on-chip memory 125 into multiple pieces of sub-convolution input data (sectioned input data). The control unit 122 loads one sectioned convolution kernel and one piece of sectioned convolution input data into the input cache 124, or the control unit 122 loads two sectioned convolution kernels and two pieces of sectioned convolution input data into the input cache 124. When the convolution kernel is sectioned by the server 11 in FIG. 1A, the integrated chip no longer needs to section the convolution kernel, so that the sectioned convolution operation can be performed quickly, thus improving processing efficiency of the convolution operation.

If the convolution kernel is sectioned by the integrated chip 12 in FIG. 1A, the server 11 inputs the convolution kernel and the convolution input data in the external memory 112 to the on-chip memory 125 of the integrated chip 12. The on-chip memory 125 receives the convolution input data and the convolution kernel transmitted by the server 11. The control unit 122 divides (or sections) the convolution input data in the on-chip memory 125 into multiple pieces of sub-convolution input data (sectioned input data). The control unit 122 also divides (or sections) the convolution kernel in the on-chip memory 125 into multiple sectioned convolution kernels. The control unit 122 loads one sectioned convolution kernel and one piece of sectioned convolution input data into the input cache 124, or the control unit 122 loads two sectioned convolution kernels and two pieces of sectioned convolution input data into the input cache 124. When the convolution kernel is sectioned by the integrated chip 12 in FIG. 1A, the server 11 does not need to section the convolution kernel, so that burden of the server 11 can be reduced.

A working process of the integrated chip 12 is illustrated with reference to FIG. 4A, FIG. 4B, and FIG. 4C. The integrated chip 12 obtains sectioned convolution kernels and sectioned convolution input data, where the sectioned convolution kernels may be sectioned by the integrated chip 12 or sectioned by the server 11. The control unit 122 reads one piece of sectioned convolution input data and N corresponding sectioned convolution kernels from the on-chip memory 125, and stores the sectioned convolution input data and the N sectioned convolution kernels into the input cache 124. The convolutional processing element 123 expands the N sectioned convolution kernels into a sectioned convolution kernel matrix with U rows and N columns, expands the sectioned convolution input data into a sectioned convolution input matrix with P rows and U columns, and performs a matrix multiplication operation on the sectioned convolution input matrix with P rows and U columns and the sectioned convolution kernel matrix with U rows and N columns, to obtain a sectioned convolution result, where N is the quantity of convolution kernels, $U=K\times K\times(D/Y)$, and $P=(M-K+1)\times(M-K+1)$. If $K=10$, $D=20$, $M=100$, and $Y=20$, $U=100$, and $P=8281$. After the convolutional processing element 123 completes the sectioned convolution operation between one piece of sectioned convolution input data and the corresponding N sectioned convolution kernels, the obtained sectioned convolution result is stored into the output cache 126. The control unit 122 reads another piece of sectioned convolution input data and another N corresponding sectioned convolution kernels from the on-chip memory 125, and stores the sectioned convolution input data and the N sectioned convolution kernels into the input cache 124, to perform a next sectioned convolution operation. After sectioned convolution operations for all sectioned convolution input data and sectioned convolution kernels are completed, all sectioned convolution results in the output cache 126 may be accumulated, to obtain a convolution operation result of one layer, that is, the convolution operation of one layer is completed. In the sectioned convolution operation process shown in FIG. 4A to FIG. 4C, the convolution kernel and the convolution input data are divided or sectioned, and sectioned convolution operations are performed on sectioned convolution input data and sectioned convolution kernels. During one sectioned convolution operation, the sectioned convolution kernel and the sectioned convolution input data do not need to be read from the on-chip memory into the input cache repeatedly, so that a data communication bandwidth between the on-chip memory and the input cache can be reduced during the convolution operation.

In some embodiments, the quantity of rows of the sectioned convolution kernel matrix corresponding to the sectioned convolution kernel and the quantity of columns of the sectioned convolution input matrix corresponding to the sectioned convolution input data are determined by the quantity of logic circuits of the convolutional processing element 123.

In the embodiment of this application, the logic circuit may include a multiplier, an adder or another device or circuitry with a logic operation capability. The quantity of rows of the sectioned convolution kernel matrix corresponding to the sectioned convolution kernel and the quantity of columns of the sectioned convolution input matrix corresponding to the sectioned convolution input data may be selected according to the quantity of logic circuits of the convolutional processing element in a following manner.

The quantity of rows of the sectioned convolution kernel matrix corresponding to the sectioned convolution kernel may be determined such that it is less than or equal to the quantity of multipliers of the convolutional processing element 123, and the quantity of columns of the sectioned convolution input matrix corresponding to the sectioned convolution input data may be determined such that it is less than or equal to the quantity of multipliers of the convolutional processing element 123.

For example, with reference to the embodiment shown in FIG. 4C, if the size of each sectioned convolution kernel is $K\times K\times(D/Y)$, the sectioned convolution kernel matrix corresponding to the N sectioned convolution kernels has U rows and N columns, and the sectioned convolution input matrix corresponding to the sectioned convolution input data has P rows and U columns, then $U=K\times K\times(D/Y)$, and thus the quantity of multipliers of the convolutional processing element 123 is greater than U.

In some embodiments, the logic circuit may include a multiplier-adder. The quantity of rows of the matrix corresponding to the sectioned convolution kernel and the quantity of columns of the matrix corresponding to the sectioned convolution input data are selected according to the quantity of logic circuits of the convolutional processing element in that:

The quantity of rows of the matrix corresponding to the sectioned convolution kernel is selected that that it is less than or equal to the quantity of multiplier-adders of the convolutional processing element; the quantity of columns of the matrix corresponding to the sectioned convolution input data is selected that that it is less than or equal to the quantity of multiplier-adders of the convolutional processing element.

For example, with reference to the embodiment shown in FIG. 4C, if the size of each sectioned convolution kernel is K×K×(D/Y), the sectioned convolution kernel matrix corresponding to the N sectioned convolution kernels has U rows and N columns, and the sectioned convolution input matrix corresponding to the sectioned convolution input data has P rows and U columns, then U=K×K×(D/Y), and thus the quantity of multipliers of the convolutional processing element 123 is greater than U.

In the foregoing embodiment, the value of Y may be determined according to the quantity of available logic circuits of the convolutional processing element 123 and the size of the convolution kernel.

If the logic circuit includes a multiplier and an adder, the quantity of available multipliers of the convolutional processing element 123 is X, and the size of the convolution kernel is K×K×D, Y needs to satisfy the following relation: Y>(K×K×D)/X.

If the logic circuit includes a multiplier-adder, the quantity of available multiplier-adders of the convolutional processing element 123 is X, and the size of the convolution kernel is K×K×D, Y needs to satisfy the following relation: Y>(K×K×D)/X.

In the matrix multiplication operation, to satisfy a matrix multiplication operation between a matrix with one row and U columns and a matrix with U rows and one column, at least U multipliers and at least one adder are required, or at least U multiplier-adders are required. After the convolution kernel with a size of K×K×D is divided into Y sections, the size of each sectioned convolution is K×K×(D/Y). If each sectioned convolution kernel is expanded to be U rows and one column, X>U=K×K×(D/Y).

In the foregoing embodiment, if the size of the convolution kernel cannot be exactly divided by X (where X is the quantity of available multiplier-adders of the convolutional processing element 123), a remainder of the division can be used as another sectioned convolution kernel. For example, assuming that the size of the convolution kernel is K×K×D, where K is the length and the height and D is the width. If K=10, D=100, and X=7, and if the convolution kernel is divided along the width direction, the convolution kernel may be divided into 15 sectioned convolution kernels, and the sizes of the 15 sectioned convolution kernels are: 10×10×7, 10×10×7, 10×10×7, 10×10×7, 10×10×7, 10×10×7, 10×10×7, 10×10×7, 10×10×7, 10×10×7, 10×10×7, 10×10×7, 10×10×7, 10×10×7, and 10×10×2 respectively.

In some embodiments, the input cache 124 includes a first storage space and a second storage space; the first storage space and the second storage space are configured to store data. Loading by the control unit 122 of the sectioned convolution kernel into the input cache 124 includes:

the control unit 122 moves data in the first storage space to the second storage space after a sectioned convolution operation of data in the second storage space is completed, and then loads another sectioned convolution kernel into the first storage space.

After the sectioned convolution operation of the data in the second storage space is completed, the control unit 122 moves the data in the first storage space to the second storage space, and the data may overwrite the previous data in the second storage space. The control unit 122 loads another sectioned convolution kernel into the first storage space, and the sectioned convolution kernel may overwrite the previous data in the first storage space. The data may be a sectioned convolution kernel. In this embodiment of this application, sectioned convolution kernels are stored in the input cache 124 in a "ping-pong storage" manner, which can constantly ensure that two sectioned convolution kernels are stored in the input cache 124. After completing one sectioned convolution operation, the convolutional processing element 123 can perform a next sectioned convolution operation quickly without waiting for loading of a sectioned convolution kernel for the next sectioned convolution operation, thus improving processing efficiency of the convolution operation.

In some embodiments, if the first storage space and the second storage space are empty, the loading by the control unit 122 of the sectioned convolution kernel into the input cache 124 includes:

the control unit 122 loads the sectioned convolution kernel into the second storage space; and the control unit 122 further loads another sectioned convolution kernel into the first storage space.

In the embodiment of this application, when the first storage space and the second storage space are empty (at the beginning of the convolution operation), it indicates that data is loaded into the input cache 124 for the first time. When data is loaded into the input cache 124 for the first time, two sectioned convolution kernels can be loaded into the input cache 124 at a time. Afterwards, the first storage space and the second storage space may be refreshed in the ping-pong fashion described above.

In some embodiments, performing of a sectioned convolution operation by the convolutional processing element 123 on the sectioned convolution kernel and the sectioned convolution input data includes:

the convolutional processing element 123 transforms the sectioned convolution kernel into a sectioned convolution kernel matrix, and transforms the sectioned convolution input data into a sectioned convolution input matrix; and the convolutional processing element 123 performs a multiplication operation by using the sectioned convolution input matrix as a multiplier and the sectioned convolution kernel matrix as a multiplicand.

In the embodiment of this application, the sectioned convolution input matrix is used as a multiplier, and the sectioned convolution kernel matrix is used as a multiplicand. During a matrix multiplication operation, the matrix multiplication operation is generally performed between each row of a matrix corresponding to the multiplier and a matrix corresponding to the multiplicand. Refer to the matrix multiplication operation process in FIG. 5 for details. If the size of the convolution kernel is 2×2×100, the quantity N of the convolution kernels is 100, and the size of the convolution input data is 100×100×100, each convolution kernel can be divided into 50 sectioned convolution kernels with a size of 2×2×2, and the convolution input data may be divided into 50 pieces of sectioned convolution input data with a size of 100×100×2. If a conventional sectioned convolution operation is used, the convolutional processing element 123 transforms the sectioned convolution kernel into a sectioned convolution kernel matrix, and transforms the sectioned convolution input data into a sectioned convolution input matrix. The convolutional processing element 123 performs a multiplication operation by using the sectioned convolution input matrix as a multiplicand and the sectioned convolution kernel matrix as a multiplier. The sectioned convolution kernel matrix has 100 rows and 8 columns (2×2×2), and the sectioned convolution input matrix has 8 rows and 9801 columns. During the matrix multiplication operation between the matrix with 100 rows and 8 columns and the matrix with 8 rows and 9801 columns, the matrix multiplication operation needs to be performed on each row of the matrix with 100 rows and 8 columns and the matrix with 8 rows and 9801 columns. In each matrix multiplication operation, a matrix with 1 row and 8 columns is multiplied by the matrix with 8 rows and 9801 columns, and each matrix multiplication operation needs to occupy a large storage space of the input cache 124.

By using the sectioned convolution operation in the embodiment of this application, the convolutional processing element 123 performs a multiplication operation by using the sectioned convolution input matrix as a multiplier and the sectioned convolution kernel matrix as a multiplicand. The sectioned convolution kernel matrix has 8 rows and 100 columns, and the sectioned convolution input matrix has 9801 rows and 8 columns. During the matrix multiplication operation between the matrix with 9801 rows and 8 columns and the matrix with 8 rows and 100 columns, the matrix multiplication operation needs to be performed on each row of the matrix with 9801 rows and 8 columns and the matrix with 8 rows and 100 columns. In each matrix multiplication operation, a matrix with 1 row and 8 columns is multiplied by the matrix with 8 rows and 100 columns, and each matrix multiplication operation occupies a small storage space of the input cache 124. Because the sectioned convolution input matrix is usually much larger than the sectioned convolution kernel matrix, by using the sectioned convolution input matrix as the multiplier and the sectioned convolution kernel matrix as the multiplicand, each matrix multiplication operation occupies a smaller storage space of the input cache 124.

Because both the convolution kernel and the convolution input data are sectioned, the quantity of rows of the sectioned convolution kernel matrix is obviously smaller, and the convolutional processing element 123 can complete the sectioned convolution operation as long as the quantity of available logic circuits of the convolutional processing element 123 is greater than or equal to the quantity of rows of the sectioned convolution kernel matrix. By implementing the embodiment of this application, the convolution operation can be completed with a limited quantity of available logic circuits, thus reducing logic circuits used for the convolution operation.

A specific process of the matrix multiplication operation between the sectioned convolution input matrix and the sectioned convolution kernel matrix is illustrated with reference to FIG. 5.

Figure 5:
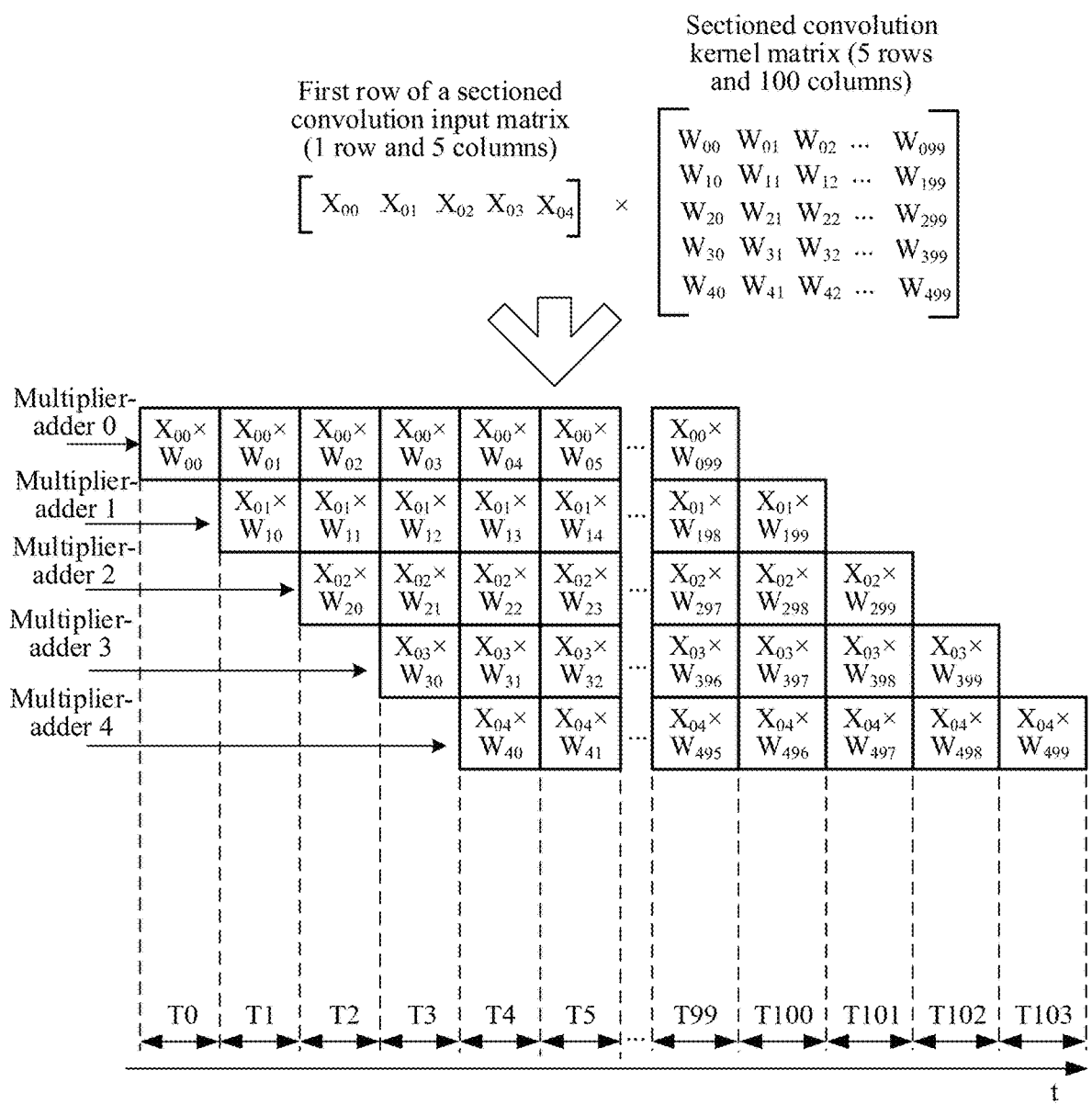
FIG. 5 is an exemplary schematic diagram of operation of logic circuits for performing a matrix multiplication operation on a row of a sectioned convolution input matrix and a sectioned convolution kernel matrix according to an embodiment of this application.

For example, as shown in FIG. 5, FIG. 5 is a schematic diagram of operation of logic circuits for performing a matrix multiplication operation between one row of a sectioned convolution input matrix and a sectioned convolution kernel matrix according to an embodiment of this application. The sectioned convolution input matrix has P rows and U columns, and the sectioned convolution kernel matrix has U rows and N columns. It is assumed that P=2000, U=5, and N=100. The specific implementation process of the logic circuits is illustrated below by using the first row of the sectioned convolution input matrix as an example.

The logic circuits that can be used for the convolution operation in the convolutional processing element 123 of the integrated chip 12 may be multipliers and adders, or may be multiplier-adders. The multiplier may perform a multiplication operation on at least two pieces of data, and output a multiplication computation result. The adder may perform an additive operation on at least two pieces of data, and output an additive computation result. In the embodiment of this application, the convolution operation is performed by using multiplier-adders (or referred to as multiplier-accumulators). A result obtained by a multiplication operation may be added with another operand; the multiplication operation and the additive operation may be performed within one clock cycle, to reduce an execution delay of the entire multiplication-addition operation.

In FIG. 5, multiplier-adders are used as an example. In FIG. 5, all sectioned convolution operations can be implemented with only 5 multiplier-adders (for example, a multiplier-adder 0, a multiplier-adder 1, a multiplier-adder 2, a multiplier-adder 3, and a multiplier-adder 4 shown in FIG. 5). For example, if a clock rate of the convolutional processing element 123 of the integrated chip 12 is 1 GHz, the clock cycle is 1 ns. It is assumed that the multiplier-adder can perform one multiplication-addition operation within one clock cycle.

As shown in FIG. 5, the first row of the sectioned convolution input matrix is $X_{00}$ $X_{01}$ $X_{02}$ $X_{03}$ $X_{04}$, and the sectioned convolution kernel matrix is
$W_{00}$ $W_{01}$ $W_{02}$ ... $W_{099}$
$W_{10}$ $W_{11}$ $W_{12}$ ... $W_{199}$
$W_{20}$ $W_{21}$ $W_{22}$ ... $W_{299}$. Thus, a matrix multiplication operation between the first row of the
$W_{30}$ $W_{31}$ $W_{32}$ ... $W_{399}$
$W_{40}$ $W_{41}$ $W_{42}$ ... $W_{499}$
sectioned convolution input matrix and the sectioned convolution kernel matrix is specifically implemented in the logic circuits of the convolutional processing element as follows:

In the first clock cycle (T0), the multiplier-adder 0 performs a multiplication operation of X00×W00, to obtain an operation result (X00×W00).

In the second clock cycle (T1), the multiplier-adder 0 transmits the operation result (X00×W00) obtained in the previous cycle to the multiplier-adder 1. Then, the multiplier-adder 0 performs a multiplication operation of X00×W01, to obtain an operation result (X00×W01). The multiplier-adder 1 performs a multiplication operation of X01×W10 and adds an obtained operation result (X01×W10) to the operation result (X00×W00) transmitted by the multiplier-adder 0 to obtain an operation result (X00×W00+X01×W10).

In the third clock cycle (T2), the multiplier-adder 0 transmits the operation result (X00×W01) obtained in the previous cycle to an adder 1. Then, the multiplier-adder 0 performs a multiplication operation of X00×W02 to obtain an operation result (X00×W02). The multiplier-adder 1 transmits the operation result (X00×W00+X01×W10) obtained in the previous cycle to the multiplier-adder 2. Then, the multiplier-adder 1 performs a multiplication operation of X01×W11 and adds an obtained operation result (X01×W11) to the operation result (X00×W01) transmitted by the multiplier-adder 0, to obtain an operation result (X00×W01+X01×W11). The multiplier-adder 2 performs a multiplication operation of X02×W20 and adds an obtained operation result (X02×W20) to the operation result (X00×W00+X01×W10) transmitted by the multiplier-adder 1 to obtain an operation result (X00×W00+X01×W10+X02×W20).

In the fourth clock cycle (T3), the multiplier-adder 0 transmits the operation result (X00×W02) obtained in the previous cycle to the adder 1. Then, the multiplier-adder 0 performs a multiplication operation of X00×W03 to obtain an operation result (X00×W03). The multiplier-adder 1 transmits the operation result (X00×W01+X01×W11) obtained in the previous cycle to the multiplier-adder 2.

Then, the multiplier-adder 1 performs a multiplication operation of X01×W12 and adds an obtained operation result (X01×W12) to the operation result (X00×W02) transmitted by the multiplier-adder 0 to obtain an operation result (X00×W02+X01×W12). The multiplier-adder 2 transmits the operation result (X00×W00+X01×W10+X02×W20) obtained in the previous cycle to the multiplier-adder 3. Then, the multiplier-adder 2 performs a multiplication operation of X02×W21 and adds an obtained operation result (X02×W21) to the operation result (X00×W01+X01× W11) transmitted by the multiplier-adder 1 to obtain an operation result (X00×W01+X01×W11+X02×W21). The multiplier-adder 3 performs a multiplication operation of X03×W30 and adds an obtained operation result (X03× W30) to an operation result (X00×W00+X01×W10+X02× W20) transmitted by the multiplier-adder 2 to obtain an operation result (X00×W00+X01×W10+X02×W20+X03× W30).

In the fifth clock cycle (T4), the multiplier-adder 0 transmits the operation result (X00×W03) obtained in the previous cycle to the adder 1. Then, the multiplier-adder 0 performs a multiplication operation of X00×W04 to obtain an operation result (X00×W04). The multiplier-adder 1 transmits the operation result (X00×W02+X01×W12) obtained in the previous cycle to the multiplier-adder 2. Then, the multiplier-adder 1 performs a multiplication operation of X01×W13 and adds an obtained operation result (X01×W13) to the operation result (X00×W03) transmitted by the multiplier-adder 0 to obtain an operation result (X00×W03+X01×W13). The multiplier-adder 2 transmits the operation result (X00×W01+X01×W11+X02×W21) obtained in the previous cycle to the multiplier-adder 3. Then, the multiplier-adder 2 performs a multiplication operation of X02×W22 and adds an obtained operation result (X02×W22) to the operation result (X00×W02+X01× W12) transmitted by the multiplier-adder 1 to obtain an operation result (X00×W02+X01×W12+X02×W22). The multiplier-adder 3 transmits the operation result (X00× W00+X01×W10+X02×W20+X03×W30) obtained in the previous cycle to the multiplier-adder 4. Then, the multiplier-adder 3 performs a multiplication operation of X03× W31 and adds an obtained operation result (X03×W31) to the operation result (X00×W01+X01×W11+X02×W21) transmitted by the multiplier-adder 2 to obtain an operation result (X00×W01+X01×W11+X02×W21+X03×W31). The multiplier-adder 4 performs a multiplication operation of X04× W40 and adds an obtained operation result (X04×W40) to the operation result (X00×W00+X01×W10+X02×W20+ X03×W30) transmitted by the multiplier-adder 3 to obtain an operation result (X00×W00+X01×W10+X02×W20+ X03×W30+X04×W40).

In the sixth clock cycle (T5), the multiplier-adder 0 transmits the operation result (X00×W04) obtained in the previous cycle to the adder 1. Then, the multiplier-adder 0 performs a multiplication operation of X00×W05 to obtain an operation result (X00×W05). The multiplier-adder 1 transmits the operation result (X00×W03+X01×W13) obtained in the previous cycle to the multiplier-adder 2. Then, the multiplier-adder 1 performs a multiplication operation of X01×W14 and adds an obtained operation result (X01×W14) to the operation result (X00×W04) transmitted by the multiplier-adder 0 to obtain an operation result (X00×W04+X01×W14). The multiplier-adder 2 transmits the operation result (X00×W02+X01×W12+X02×W22) obtained in the previous cycle to the multiplier-adder 3. Then, the multiplier-adder 2 obtains a multiplication operation of X02×W23 and adds an obtained operation result (X02×W23) to the operation result (X00×W03+X01×W13) transmitted by the multiplier-adder 1 to obtain an operation result (X00×W03+X01×W13+X02×W23). The multiplier-adder 3 transmits the operation result (X00×W01+X01× W11+X02×W21+X03×W31) obtained in the previous cycle to the multiplier-adder 4. Then, the multiplier-adder 3 performs a multiplication operation of X03×W32 and adds an obtained operation result (X03×W32) to the operation result (X00×W02+X01×W12+X02×W22) transmitted by the multiplier-adder 2 to obtain an operation result (X00×W02+ X01×W12+X02×W22+X03×W32). The multiplier-adder 4 outputs the operation result (X00×W00+X01×W10+X02× W20+X03×W30+X04×W40) obtained in the previous cycle to the output cache for storage. Then, the multiplier-adder 4 performs a multiplication operation of X04×W41 and adds an obtained operation result (X04×W41) to the operation result (X00×W01+X01×W11+X02×W21+X03×W31) transmitted by the multiplier-adder 3 to obtain an operation result (X00×W01+X01×W11+X02×W21+X03×W31+ X04×W41).

Starting from the fifth clock cycle (T4), the five multiplier-adders (multiplier-adder 0, multiplier-adder 1, multiplier-adder 2, multiplier-adder 3, multiplier-adder 4) all begin to perform multiplication operations. Till the $101^{st}$ clock cycle (T100), the multiplier-adder 0 completes the convolution multiplication operation between the first row of the sectioned convolution input matrix and the sectioned convolution kernel matrix, and the convolution multiplication operation between the second row of the sectioned convolution input matrix and the sectioned convolution kernel matrix can be started. If the second row of the sectioned convolution input matrix is $X_{10} X_{11} X_{12} X_{13} X_{14}$, in the $101^{st}$ clock cycle (T100), the multiplier-adder 0 performs a multiplication operation of X10×W00 to obtain an operation result (X10×W00). It can be seen from FIG. 5 that, when the multiplier-adders in the embodiment of this application perform matrix multiplication operations, the multiplier-adder 0, the multiplier-adder 1, the multiplier-adder 2, the multiplier-adder 3, and the multiplier-adder 4 operate as a pipeline, and the operation between the sectioned convolution input matrix and the sectioned convolution kernel matrix is completed when matrix multiplication operations for all rows of the sectioned convolution input matrix are performed. Then, an operation between a next sectioned convolution input matrix and a next sectioned convolution kernel matrix is started.

Starting from the sixth clock cycle (T5), the multiplier-adder 4 outputs an operation result obtained in the previous cycle to the output cache for storage in each cycle. After the $104^{th}$ cycle (T103) is ended, the multiplier-adder 4 finishes the last multiplication-addition operation of the convolution multiplication operation between the first row of the sectioned convolution input matrix and the sectioned convolution kernel matrix, and outputs the last operation result to the output cache for storage in the $105^{th}$ cycle, thus completing the operation between the first row of the sectioned convolution input matrix and the sectioned convolution kernel matrix. The multiplication operation between the second row of the sectioned convolution input matrix and the sectioned convolution kernel matrix begins in the $101^{st}$ clock cycle (T100). A method for the multiplication operation between the second row of the sectioned convolution input matrix and the sectioned convolution kernel matrix is similar to the foregoing method for the multiplication operation between the first row of the sectioned convolution input matrix and the sectioned convolution kernel matrix, and details are not described herein again.

Similarly, operation processes between other rows of the sectioned convolution input matrix and the sectioned convolution kernel matrix can also be completed by using the five multiplier-adders, thus completing the operation between the sectioned convolution input matrix and the sectioned convolution kernel matrix. Further, the same logic circuits can be used for operations between other sectioned convolution input matrices and other sectioned convolution kernel matrices to implement multiplication-addition operations.

It can be seen from the foregoing example that, the quantity of rows of the sectioned convolution kernel matrix equals the minimum quantity of multiplier-adders. The size of the divided convolution kernel can be determined according to available logic circuits of the convolutional processing element. For example, if a data volume of the convolution kernel is Q and the convolution kernel is evenly divided into Y sectioned convolution kernels, a data volume of each sectioned convolution kernel is Q/Y. If the quantity of available logic circuits (for example, multiplier-adders) of the convolutional processing element is large, Y may be set to a small value, so that the quantity of rows (Q/Y) of the sectioned convolution kernel matrix is large, to meet a requirement of fast operation processing. When there are multiple convolutional processing elements, the multiple convolutional processing elements may be used to perform operations on different sectioned convolution kernel matrices at the same time, thus further improving the speed of the convolution operation. If there are few logic circuits in the integrated chip, Y may be set to a large value, so that the quantity of rows (Q/Y) of the sectioned convolution kernel matrix is small, to save logic circuits and implement a multi-layer convolution operation while few logic circuits are occupied.

In some embodiments, the storage of the sectioned convolution result by the convolutional processing element 123 into the output cache 126 includes:

the convolutional processing element 123 accumulates the sectioned convolution result and data stored in the output cache 126 and writes an accumulation into the output cache 126.

For example, the convolutional processing element 123 performs a convolution operation on the first sectioned convolution kernel and the first sectioned convolution input data to obtain a sectioned convolution result of a first section, and stores the sectioned convolution result of the first section into the output cache 126. The convolutional processing element 123 performs a convolution operation on the second sectioned convolution kernel and the second sectioned convolution input data to obtain a sectioned convolution result of a second section, accumulates the sectioned convolution result of the second section and the sectioned convolution result of the first section stored in the output cache 126, and writes an accumulation into the output cache 126. Similarly, the convolutional processing element 123 performs a convolution operation on the $Y^{th}$ sectioned convolution kernel and the $Y^{th}$ sectioned convolution input data, to obtain a sectioned convolution result of a $Y^{th}$ section, accumulates the sectioned convolution result of the $Y^{th}$ section with an accumulation result of the sectioned convolution results of the first section to the $(Y-1)^{th}$ section stored in the output cache 126, and writes an accumulation into the output cache 126. In the embodiment of this application, each time a sectioned convolution operation is completed, the convolutional processing element 123 accumulates the obtained sectioned convolution result with data previously stored in the output cache 126. In the embodiment of this application, the sectioned convolution result is accumulated immediately after each sectioned convolution operation. It is unnecessary to accumulate the sectioned convolution results after all the sectioned convolution operations are finished, thus improving the processing efficiency of the whole convolution operation.

In some embodiments, after all data of the convolution kernel participates in sectioned convolution operations, the convolutional processing element 123 performs post-processing computing on data stored in the output cache 126 to obtain a post-processing convolution result, and performs a transposing operation on a matrix corresponding to the post-processing convolution result, to obtain a transposed matrix of the matrix corresponding to the post-processing convolution result.

Alternatively, after all data of the convolution kernel participates in sectioned convolution operations, the convolutional processing element 123 performs a transposing operation on a matrix corresponding to data stored in the output cache 126, to obtain a transposed matrix of the matrix corresponding to the data stored in the output cache.

The control unit 122 stores a convolution result corresponding to the transposed matrix into the on-chip memory 125 as convolution input data.

In the embodiment of this application, the post-processing computing includes at least one of activation function computing, pooling computing, and normalization computing, and whether or not the post-processing computing is performed is determined according to the convolutional neural network algorithm. The sectioned convolution operation in the embodiment of this application uses sectioned convolution input data as a multiplier and uses a sectioned convolution kernel as a multiplicand, which is different from a conventional convolution operation that uses a convolution kernel as a multiplier and uses convolution input data as a multiplicand. Therefore, rows and columns of data obtained after the sectioned convolution operation are reversed, and the matrix obtained after the sectioned convolution operation needs to be transposed. For example, a convolution result obtained in the related technology has N rows and P columns, and a convolution result obtained in the embodiment of this application has P rows and N columns. The matrix of the convolution result obtained in the embodiment of this application is transposed, thereby obtaining a convolution result with N rows and P columns.

The integrated chip 12 in FIG. 2A may section the convolution kernel and the convolution input data, and may divide the convolution kernel and the convolution input data. During one sectioned convolution operation, it is unnecessary to read the sectioned convolution kernel and the sectioned convolution input data into the input cache repeatedly, so that a data communication bandwidth between the memory and the input cache 124 during the convolution operation may be reduced. In addition, because the sectioned convolution kernel and the sectioned convolution input data are both small (compared with un-sectioned convolution kernel and input), an input cache 124 with a small storage space may be used, thus reducing the requirement of the convolutional neural network algorithm on the size of the input cache 124. Moreover, because the sectioned convolution kernel and the sectioned convolution input data are both small, the convolution operation can still be performed in a case that the amount of logic circuits of the convolutional processing element 12 are limited. A bandwidth between devices refers to a capability of data transmission between two devices. For example, a bandwidth between the memory and the input cache 124 can be construed as a speed of reading data by the input cache 124 from the memory and a speed of reading data by the memory from the input cache 124. If the bandwidth is larger, the reading speed is higher. The unit of the bandwidth may be Gb/s.

The convolution operation in the embodiment of this application may be applied to an image processing application. For example, the convolution operation may be applied to application scenarios such as object recognition, image classification, and image filtering. As shown in FIG. 1C, inputted image data is subjected to operations such as a convolution operation, pooling, and normalization. Finally, after processing by a fully-connected layer and a regression operation, an image processing result is outputted. The convolution operation may include multiple layers, and in the convolution operation of each layer, a convolution operation is performed between the convolution input data of this layer and convolution kernels of this layer. The convolution operation result of each layer may be used as convolution input data of the convolution operation of a next layer. Convolution input data of a first-layer convolution operation is the inputted image data, and the first-layer convolution operation is a convolution operation performed between the inputted image data and the convolution kernels of the first layer. The inputted image data may be data (such as a gray value and an RGB value) of all pixels in one image, for example, data with a size of 1000×600×3 (where 3 is an RGB value) formed by 1000×600 pixels. In the convolution operation of each layer in the embodiment of this application, the convolution kernels and the convolution input data of each layer may be divided or sectioned, to obtain multiple sectioned convolution kernels and multiple pieces of corresponding sectioned convolution input data. During one sectioned convolution operation, the sectioned convolution kernels and the sectioned convolution input data do not need to be read into the input cache repeatedly, so that a bandwidth between the on-chip memory 125 and the input cache 124 can be reduced during the convolution operation. Moreover, because the sectioned convolution kernels and the sectioned convolution input data are both small, an input cache 124 with a small storage space may be used, thus reducing the requirement of the convolutional neural network algorithm on the size of the input cache 124. Moreover, because the sectioned convolution kernel and the sectioned convolution input data are both small, the convolution operation can still be performed in a case that the amount of logic circuits of the convolutional processing element 12 are limited.

Figure 6:
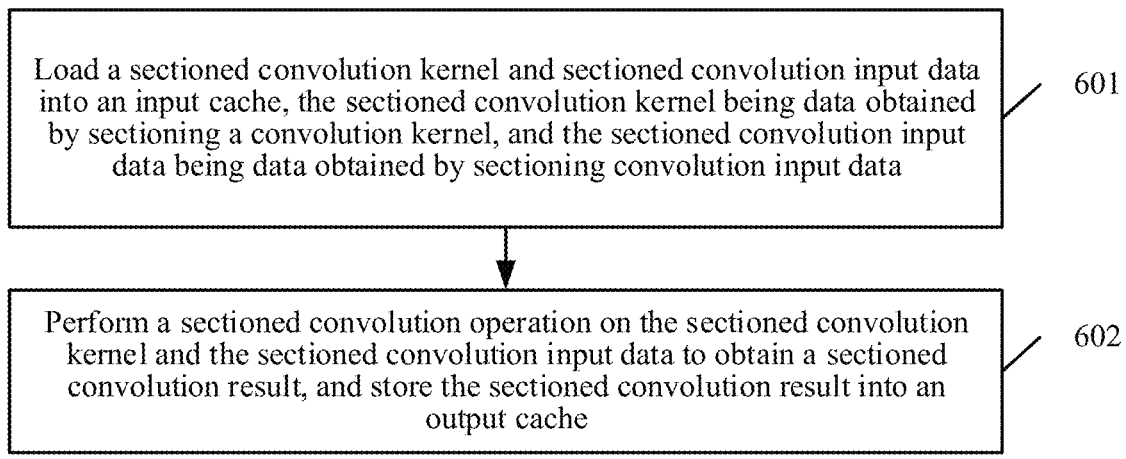
FIG. 6 is an exemplary schematic logic and data flow of a convolution operation processing method according to an embodiment of this application.

Referring to FIG. 6, FIG. 6 is an exemplary logic and data flow of a convolution operation processing method according to an embodiment of this application. As shown in FIG. 6, the convolution operation processing method includes the following steps:

601. Load a sectioned convolution kernel and sectioned convolution input data into an input cache, the sectioned convolution kernel being data obtained by sectioning a convolution kernel, and the sectioned convolution input data being data obtained by sectioning convolution input data.

602. Perform a sectioned convolution operation on the sectioned convolution kernel and the sectioned convolution input data to obtain a sectioned convolution result, and store the sectioned convolution result into an output cache.

In the embodiment of this application, step 601 and step 602 may be performed by the integrated chip shown in FIG. 1A or FIG. 1B. The integrated chip is configured to perform a convolution operation. The integrated chip includes a control unit configured to perform a convolution operation, a convolutional processing element, an input cache, an output cache, an on-chip memory, and the like. Step 601 and step 602 may also be performed by an apparatus including a central processing unit, an input/output device, a memory, and a communications bus. The central processing unit, the input/output device, and the memory are connected through a communications bus. The central processing unit is configured to perform a convolution operation. The central processing unit includes a logic circuit configured to perform a convolution operation, for example, a multiplier, an adder, a multiplier-adder, or the like. The memory is configured to store sectioned convolution kernels and sectioned convolution input data. For ease of description, the convolution operation processing method in FIG. 6 being performed by the integrated chip shown in FIG. 1A or FIG. 1B is used as an example for description.

For specific implementation of the method shown in FIG. 6, reference may be made to the embodiment about the integrated chip in FIG. 2A to FIG. 5. Details are not described herein again.

In the method shown in FIG. 6, the convolution kernel is divided (or sectioned). During one sectioned convolution operation, the sectioned convolution kernel and the sectioned convolution input data do not need to be read from the on-chip memory into the input cache repeatedly, so that a data communication bandwidth between the on-chip memory and the input cache can be reduced during the convolution operation. Moreover, because the sectioned convolution kernel and the sectioned convolution input data are both small, an input cache with a small storage space may be used, thereby reducing a device bandwidth requirement and an input cache requirement of the convolutional neural network algorithm.

In some embodiments, before step 601 is performed, the following steps may be further performed:

receiving convolution input data and sectioned convolution kernels, and sectioning the convolution input data to obtain sectioned convolution data; or receiving the convolution input data and the convolution kernels, sectioning the convolution input data to obtain sectioned convolution data, and sectioning the convolution kernels to obtain sectioned convolution kernels.

In the embodiment of this application, the convolution kernels may be sectioned by the server 11 in FIG. 1A or FIG. 1B, or may be sectioned by the integrated chip 12. The convolution input data may be sectioned by the integrated chip 12. When the convolution kernels are sectioned by the server 11 in FIG. 1A, the integrated chip no longer needs to section the convolution kernel, so that the sectioned convolution operation can be performed quickly, thus improving processing efficiency of the convolution operation. When the convolution kernels are sectioned by the integrated chip 12 in FIG. 1A, the server 11 does not need to section the convolution kernel, thus reducing burden of the server 11.

In some embodiments, a quantity of rows of a matrix corresponding to the sectioned convolution kernel and a quantity of columns of a matrix corresponding to the sectioned convolution input data is determined according to a quantity of logic circuits for performing convolution operations.

In some embodiments, that a quantity of rows of a matrix corresponding to the sectioned convolution kernel and a quantity of columns of a matrix corresponding to the sectioned convolution input data is determined according to the quantity of logic circuits for performing convolution operations may include:

The quantity of rows of the matrix corresponding to the sectioned convolution kernel is less than or equal to a quantity of multiplier-adders for performing convolution operations; and the quantity of columns of the matrix corresponding to the sectioned convolution input data is less than or equal to the quantity of multiplier-adders for performing convolution operations.

When multiplier-adders are used for performing convolution operations, a result obtained by a multiplication operation may be added to another operand. The multiplication operation and the additive operation may be performed within one clock cycle, to reduce an execution delay of the whole multiplication-addition operation.

In some embodiments, performing the sectioned convolution operation on the sectioned convolution kernels and the sectioned convolution input data includes:

transforming the sectioned convolution kernels into a sectioned convolution kernel matrix, and transforming the sectioned convolution input data into a sectioned convolution input matrix; and performing a multiplication operation by using the sectioned convolution input matrix as a multiplier and the sectioned convolution kernel matrix as a multiplicand.

In the embodiment of this application, during a matrix multiplication operation, because the sectioned convolution input matrix is usually much larger than the sectioned convolution kernel matrix, by using the sectioned convolution input matrix as the multiplier and the sectioned convolution kernel matrix as the multiplicand, each matrix multiplication operation occupies a smaller storage space of the input cache 124. Because the convolution kernel and the convolution input data are both sectioned, the quantity of rows of the sectioned convolution kernel matrix is obviously smaller than the quantity of columns of a matrix corresponding to an undivided (un-sectioned) convolution kernel. The convolutional processing element can complete the sectioned convolution operation as long as the quantity of available logic circuits of the convolutional processing element is greater than or equal to the quantity of rows of the sectioned convolution kernel matrix. By implementing the embodiment of this application, the convolution operation can be completed with a limited quantity of available logic circuits, thereby reducing the amount of logic circuits required for the convolution operation.

In some embodiments, storing the sectioned convolution result into the output cache 126 includes:

accumulating the sectioned convolution result and data stored in the output cache and writing an accumulation into the output cache 126.

In the embodiment of this application, the sectioned convolution result is accumulated immediately after each sectioned convolution operation. It is unnecessary to separately accumulate the sectioned convolution results after all the sectioned convolution operations are finished, thus improving the processing efficiency of the whole convolution operation.

In some embodiments, the input cache includes a first storage space and a second storage space. The first storage space and the second storage space are configured to store data. Step 601 of loading the sectioned convolution kernel into the input cache includes:

moving data in the first storage space to the second storage space after a sectioned convolution operation of data in the second storage space is performed, and then loading the sectioned convolution kernel into the first storage space.

After the sectioned convolution operation of the data in the second storage space is performed, the data in the first storage space is moved to the second storage space, and the data may overwrite the previous data in the second storage space. The sectioned convolution kernel is loaded into the first storage space, and the sectioned convolution kernel may overwrite the previous data in the first storage space. The data may be a sectioned convolution kernel. Sectioned convolution kernels are stored in the input cache 124 in a "ping-pong storage" manner, which can constantly ensure that two sectioned convolution kernels are stored in the input cache 124. After completing one sectioned convolution operation, the convolutional processing element 123 can perform a next sectioned convolution operation quickly without waiting for loading of a sectioned convolution kernel for the next sectioned convolution operation, thus improving processing efficiency of the convolution operation.

In some embodiments, if the first storage space and the second storage space are empty, and step 601 of loading the sectioned convolution kernel into the input cache includes:

loading the sectioned convolution kernel into the second storage space; and loading another sectioned convolution kernel into the first storage space.

The embodiment of this application illustrates the first storage process of "ping-pong storage". When data is loaded into the input cache 124 for the first time, two sectioned convolution kernels can be loaded into the input cache 124 at a time.

Figure 7:
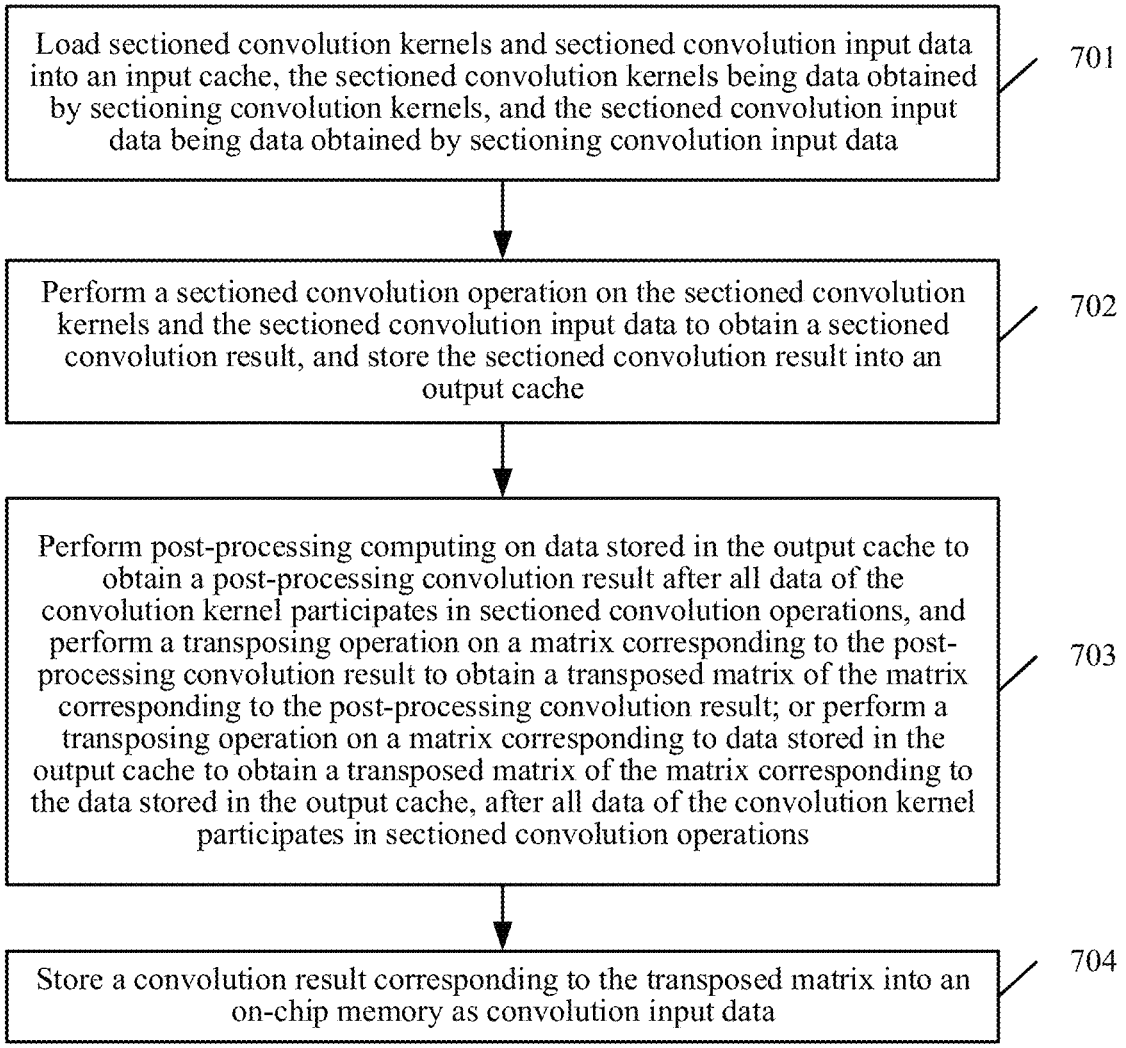
FIG. 7 is an exemplary schematic logic and data flow of another convolution operation processing method according to an embodiment of this application.

Referring to FIG. 7, FIG. 7 is an exemplary logic and data flow of another convolution operation processing method according to an embodiment of this application. FIG. 7 is obtained by further optimization based on FIG. 6. As shown in FIG. 7, the convolution operation processing method includes the following steps:

701. Load a sectioned convolution kernels and sectioned convolution input data into an input cache, the sectioned convolution kernels being data obtained by sectioning a convolution kernels, and the sectioned convolution input data being data obtained by sectioning convolution input data.

702. Perform a sectioned convolution operation on the sectioned convolution kernels and the sectioned convolution input data to obtain a sectioned convolution result, and store the sectioned convolution result into an output cache.

703. Perform post-processing computing on data stored in the output cache to obtain a post-processing convolution result after all data of the convolution kernels participates in sectioned convolution operations, and perform a transposing operation on a matrix corresponding to the post-processing convolution result to obtain a transposed matrix of the matrix corresponding to the post-processing convolution result; or perform a transposing operation on a matrix corresponding to data stored in the output cache to obtain a transposed matrix of the matrix corresponding to the data stored in the output cache, after all data of the convolution kernel participates in sectioned convolution operations.

704. Store a convolution result corresponding to the transposed matrix into an on-chip memory as convolution input data.

The post-processing computing includes at least one of activation function computing, pooling computing, and normalization computing, and whether or not the post-processing computing is performed is determined according to the convolutional neural network algorithm. In the field of image processing, due to a correlation between data in adjacent regions, pooling computing is performed to reduce the amount of data in the convolution result, or to remove some redundant data. For example, for data of an original image with a size of 24×24, a 5×5 convolution kernel is used for performing convolution, to obtain a 20×20 convolution result. After 2×2 pooling, a final result becomes 10×10.

The sectioned convolution operation in the embodiment of this application uses sectioned convolution input data as a multiplier and uses sectioned convolution kernel data as a multiplicand, which is different from a conventional convolution operation that uses convolution kernel data as a multiplier and uses convolution input data as a multiplicand. Therefore, rows and columns of data obtained after the sectioned convolution operation are reversed, and the matrix obtained after the sectioned convolution operation needs to be transposed. For example, a convolution result obtained in the related technology has N rows and P columns, and a convolution result obtained in the embodiment of this application has P rows and N columns. The matrix of the convolution result obtained in the embodiment of this application is transposed, thus obtaining a convolution result with N rows and P columns.

For step 701 to step 702, reference may be made to step 601 to step 602 in FIG. 6, and details are not described herein again.

For specific implementation of the method shown in FIG. 7, reference may be made to the embodiment about the integrated chip in FIG. 2A to FIG. 5, and details are not described herein again.

Figure 8:
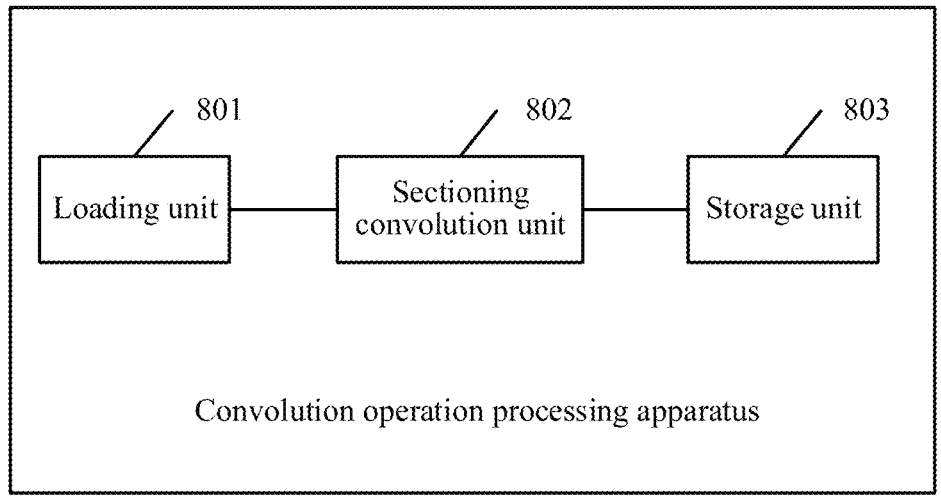
FIG. 8 is an exemplary schematic structural diagram of a convolution operation processing apparatus according to an embodiment of this application.

Referring to FIG. 8, FIG. 8 is an exemplary schematic structural diagram of a convolution operation processing apparatus according to an embodiment of this application. The convolution operation processing apparatus includes a loading unit 801, a sectioning convolution unit 802, and a storage unit 803.

The loading unit 801 is configured to load sectioned convolution kernels and sectioned convolution input data into an input cache, the sectioned convolution kernels being data obtained by sectioning convolution kernels, and the sectioned convolution input data being data obtained by sectioning convolution input data.

The sectioning convolution unit 802 is configured to perform a sectioned convolution operation on the sectioned convolution kernels and the sectioned convolution input data to obtain a sectioned convolution result.

The storage unit 803 is configured to store the sectioned convolution result into an output cache.

For implementation of the convolution operation processing apparatus shown in FIG. 8, reference may be made to the method embodiment shown in FIG. 6 to FIG. 7, and repeated parts are not described herein again.

By implementing the convolution operation processing apparatus shown in FIG. 8, during one sectioned convolution operation, the sectioned convolution kernels and the sectioned convolution input data do not need to be read from the on-chip memory into the input cache repeatedly, so that a data communication bandwidth between the on-chip memory and the input cache can be reduced during the convolution operation.

Figure 9:
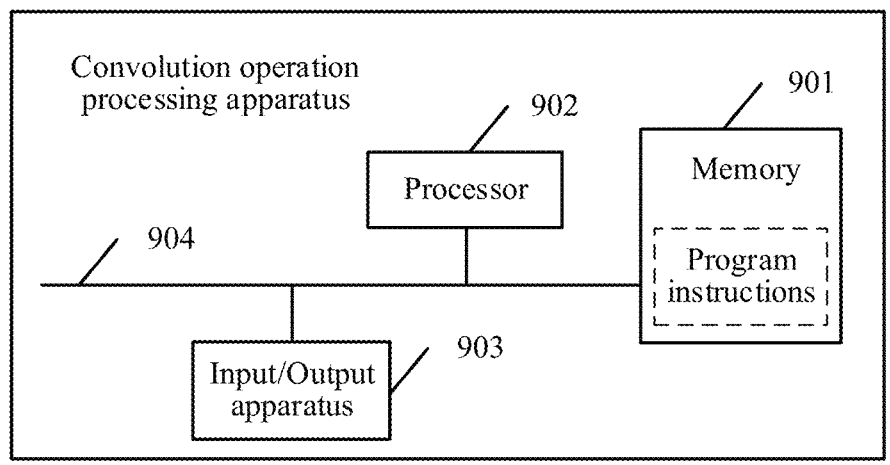
FIG. 9 is an exemplary schematic structural diagram of another convolution operation processing apparatus according to an embodiment of this application.

Referring to FIG. 9, FIG. 9 is a schematic structural diagram of another convolution operation processing apparatus according to an embodiment of this application. As shown in FIG. 9, the convolution operation processing apparatus may include a memory 901, a processor 902, and an input/output apparatus 903. The memory 901, the processor 902, and the input/output apparatus 903 may be connected through a communications bus 904. The memory 901 is configured to store program instructions, and the program instructions are suitable to be loaded by the processor 902. The input/output apparatus 903 may be configured to receive convolution input data, and configured to output a convolution processing result.

The processor 902 is configured to load the program instructions and perform some or all of the steps of the method in FIG. 6 to FIG. 7.

By implementing the convolution operation processing apparatus shown in FIG. 9, during one sectioned convolution operation, the sectioned convolution kernels and the sectioned convolution input data do not need to be read from the on-chip memory into the input cache repeatedly, so that a data communication bandwidth between the on-chip memory and the input cache can be reduced during the convolution operation.

The embodiment of this application further provides a computer storage medium. The computer storage medium stores multiple program instructions. The program instructions are suitable to be loaded by a processor to perform some or all of the steps of any convolution operation processing method according to the foregoing method embodiments.

The steps in the method of the embodiment of this application may be performed in other orders, or may be combined and deleted according to actual applications.

The units in the convolution operation processing apparatus in the embodiment of this application may be combined, divided, and deleted according to actual applications.

A person of ordinary skill in the art understands that all or some of the steps in the various methods of the foregoing embodiments may be implemented by a computer program instructing relevant computer hardware. The program may be stored in a non-transitory computer readable storage medium. The storage medium includes a read-only memory (ROM), a random access memory (RAM), a programmable read-only memory (PROM), an erasable programmable read-only memory (EPROM), a one-time programmable read-only memory (OTPROM), an electrically-erasable programmable read-only memory (EEPROM), a compact disc read-only memory (CD-ROM), or other optical disc memories, magnetic disk memories or magnetic tape memories, or any other computer readable medium that can be configured to carry or store data.

In conclusion, the scope of the claims is not to be limited to the implementations in the examples described above, and the specification is to be explained in a broadest manner.

What is claimed is:

1. An integrated chip, comprising: a control unit, at least one convolutional processing element, an on-chip memory, an input cache, and an output cache, wherein:
    the control unit is configured to:
        extract, from original convolution input data stored in an off-chip memory, data for performing a plurality of convolution operations as convolution input data, and load the convolution input data into the on-chip memory; and
        load a sectioned convolution kernel and sectioned convolution input data of convolution input data into the input cache, the sectioned convolution kernel being generated by sectioning a convolution kernel and comprising a plurality of convolution kernel segments, and the sectioned convolution input data being generated by sectioning the convolution input data and comprising a plurality of convolution input data segments; and
    the at least one convolutional processing element is configured to perform a sectioned convolution operation on the sectioned convolution kernel and the sectioned convolution input data to obtain a sectioned convolution result, and storing the sectioned convolution result into the output cache.

2. An integrated chip, comprising: a control unit, at least one convolutional processing element, an input cache, and an output cache, wherein:
the control unit is configured to:
obtain a convolution kernel, the convolution kernel comprising a plurality of convolution elements arranged in a Y-dimensional space, and Y being a positive integer;
obtain a size of the input cache;
segment the convolution kernel in the Y-dimensional space according to the size of the input cache, to obtain a plurality of convolution kernel segments, wherein each of the convolution kernel segments comprises a plurality of adjacent convolution elements in the Y-dimensional space, and a data volume of each of the convolution kernel segments is smaller than the size of the input cache; and
load the plurality of convolution kernel segments and sectioned convolution input data into the input cache, the sectioned convolution input data being generated by sectioning convolution input data and comprising a plurality of convolution input data segments; and
the at least one convolutional processing element is configured to perform a sectioned convolution operation on the plurality of convolution kernel segments and the sectioned convolution input data to obtain a sectioned convolution result, and store the sectioned convolution result into the output cache.

3. The integrated chip according to claim 2, wherein the control unit is configured to:
obtain a quantity of logic circuits in the at least one convolutional processing element, and determine a first quantity of convolution elements in each of the plurality of convolution kernel segments according to the quantity of logic circuits;
obtain a size of the input cache, and determine a second quantity of convolution elements in each of the plurality of convolution kernel segments according to the size of the input cache; and
segment the convolution kernel in the Y-dimensional space to obtain the plurality of convolution kernel segments, wherein a quantity of convolution elements in each of the plurality of convolution kernel segments is a smaller value of the first quantity and the second quantity.

4. The integrated chip according to claim 2, wherein the control unit is configured to:
determine a first direction of the convolution input data with a minimum quantity of data elements among a plurality of directions of the Y-dimensional space; and
segment the convolution kernel along the first direction, to obtain the plurality of convolution kernel segments.

5. The integrated chip according to claim 1, wherein the control unit is configured to:
obtain the convolution input data, the convolution input data comprising a plurality of data elements arranged in a Y-dimensional space, and Y being a positive integer;
segment the convolution input data to obtain the plurality of convolution input data segments, wherein a quantity of data elements in each of the plurality of convolution input data segments and an arrangement manner of the data elements in the Y-dimensional space are the same as each of the plurality of convolution kernel segments, and each of the plurality of convolution input data segments comprises convolution input data groups corresponding to each of the plurality of convolution kernel segments;
load, into the input cache, a first convolution kernel segment of the plurality of convolution kernel segments and a first convolution input data group among the convolution input data groups of a first convolution input data segmenta ; and
load a second convolution input data group among the convolution input data groups of the first convolution input data segment into the input cache to replace the first convolution input data group after the at least one convolutional processing element performs the sectioned convolution operation on the first convolution input data group and the first convolution kernel segment, so that the at least one convolutional processing element performs a sectioned convolution operation on the second convolution input data group and the first convolution kernel segment.

6. The integrated chip according to claim 5, wherein the at least one convolutional processing element comprises a plurality of convolutional processing elements; and
the control unit is configured to load the first convolution input data group in the first convolution input data segment into portion of the input cache corresponding to each of the plurality of convolutional processing elements, and load the first convolution kernel segment into the input cache, so that each convolutional processing element performs a convolution operation on the first convolution input data group and the first convolution kernel segment.

7. The integrated chip according to claim 5, wherein the control unit is configured to:
load a second convolution input data group of the first convolutional input data segment different from the first convolution input data group into the input cache for performing convolution operation between the second convolution input data group and the first convolution kernel segment.

8. The integrated chip according to claim 5, wherein the control unit is configured to:
load, into the input cache, a second convolution kernel segment in the plurality of convolution kernel segments and a first convolution input data group in a second convolution input data segment after the convolutional processing element completes a sectioned convolution operation on the first convolution kernel segment and all convolution input data group of the first convolution input data segment, so that the convolutional processing element performs additional sectioned convolution operation on the second convolution kernel segment and the first convolution input data group of the second convolution input data segment; and
the convolutional processing element is configured to:
superimpose a sectioned convolution result of the second convolution kernel segment and the first convolution input data group of the second convolution input data segment onto a second sectioned convolution result stored in the output cache.

9. The integrated chip according to claim 1, wherein the control unit is configured to:
extract, from the original convolution input data, second data for performing a plurality of convolution operations, load a portion of the second data, which is different from current convolution input data in the on-chip memory, into the on-chip memory, to form the second data in the on-chip memory, and use the second data in the on-chip memory as the convolution input data for convolution operations.

10. The integrated chip according to claim 9, wherein the control unit is configured to:
   extract, from the original convolution input data, second data for performing a plurality of convolution operations, and load a portion of the second data, which is different from the convolution input data currently stored in the on-chip memory, into the on-chip memory to form the second data, before a convolution operation on the convolution input data currently stored in the on-chip memory is completed; and
   use the second data in the on-chip memory as the convolution input data for convolution operations after the convolution operation on the convolution input data currently stored in the on-chip memory is completed.

11. An integrated chip, comprising: a control unit, at least one convolutional processing element, an input cache, and an output cache, wherein:
   the control unit is configured to load a sectioned convolution kernel and sectioned convolution input data into the input cache, the sectioned convolution kernel being generated by sectioning a convolution kernel and comprising a plurality of convolution kernel segments, and the sectioned convolution input data being generated by sectioning convolution input data and comprising a plurality of convolution input data segments;
   the at least one convolutional processing element is configured to perform a sectioned convolution operation on the sectioned convolution kernel and the sectioned convolution input data to obtain a sectioned convolution result, and storing the sectioned convolution result into the output cache; and
   a quantity of rows of a matrix corresponding to the sectioned convolution kernel and a quantity of columns of a matrix corresponding to the sectioned convolution input data are determined by a quantity of logic circuits of the convolutional processing element.

12. The integrated chip according to claim 11, wherein the quantity of rows of the matrix corresponding to the sectioned convolution kernel is less than or equal to a quantity of multiplier-adders of the convolutional processing element, and the quantity of columns of the matrix corresponding to the sectioned convolution input data is less than or equal to the quantity of the multiplier-adders of the convolutional processing element.

13. An integrated chip, comprising: a control unit, at least one convolutional processing element, an input cache, and an output cache, wherein:
   the control unit is configured to load a sectioned convolution kernel and sectioned convolution input data into the input cache, the sectioned convolution kernel being generated by sectioning a convolution kernel and comprising a plurality of convolution kernel segments, and the sectioned convolution input data being generated by sectioning convolution input data and comprising a plurality of convolution input data segments; and
   the at least one convolutional processing element is configured to:
      transform the sectioned convolution kernel into a sectioned convolution kernel matrix, and transform the sectioned convolution input data into a sectioned convolution input matrix;
      perform a sectioned convolution operation on the sectioned convolution kernel and the sectioned convolution input data to obtain a sectioned convolution result by at least performing a multiplication operation using the sectioned convolution input matrix as a multiplier and the sectioned convolution kernel matrix as a multiplicand; and
      store the sectioned convolution result into the output cache.

14. The integrated chip according to claim 13, wherein the convolutional processing element is configured to:
   accumulate the sectioned convolution result and data stored in the output cache and write an accumulation into the output cache.

15. The integrated chip according to claim 14, wherein the convolutional processing element is configured to:
   perform post-processing computing on data stored in the output cache to obtain a post- proces sing convolution result after all data of the convolution kernel participates in sectioned convolution operations; and perform a transposing operation on a matrix corresponding to the post-processing convolution result to obtain a transposed matrix of the matrix corresponding to the post-processing convolution result; or
   perform a transposing operation on a matrix corresponding to data stored in the output cache to obtain a transposed matrix of the matrix corresponding to the data stored in the output cache, after all data of the convolution kernel participates in sectioned convolution operations; and
   the control unit is configured to store a convolution result corresponding to the transposed matrix into an on-chip memory as convolution input data.

16. A convolution operation processing method, applied to an integrated chip, comprising:
   extracting, from original convolution input data stored in an off-chip memory, data for performing a plurality of convolution operations as convolution input data, and loading the convolution input data into an on-chip memory;
   loading a sectioned convolution kernel and sectioned convolution input data of convolution input data into an input cache, the sectioned convolution kernel being generated by sectioning a convolution kernel and comprising a plurality of convolution kernel segments, and the sectioned convolution input data being generated by sectioning the convolution input data and comprising a plurality of convolution input data segments; and
   performing a sectioned convolution operation on the sectioned convolution kernel and the sectioned convolution input data to obtain a sectioned convolution result, and storing the sectioned convolution result into an output cache.

17. The method according to claim 16, further comprising:
   obtaining the convolution kernel, the convolution kernel comprising a plurality of convolution elements arranged in a Y-dimensional space, and Y being a positive integer;
   obtaining a size of the input cache; and
   segmenting the convolution kernel in the Y-dimensional space according to the size of the input cache, to obtain the plurality of convolution kernel segments, wherein each of the convolution kernel segments comprises a plurality of adjacent convolution elements in the Y-dimensional space, and a data volume of each of the convolution kernel segments is smaller than the size of the input cache.

18. The method according to claim 16, further comprising:
- obtaining the convolution input data, the convolution input data comprising a plurality of data elements arranged in a Y-dimensional space, and Y being a positive integer;
- segmenting the convolution input data to obtain the plurality of convolution input data segments, wherein a quantity of data elements in each of the plurality of convolution input data segments and an arrangement manner of the data elements in the Y-dimensional space are the same as each of the plurality of convolution kernel segments, and each of the plurality of convolution input data segments comprises convolution input data groups corresponding to each of the plurality of convolution kernel segments;
- loading, into the input cache, a first convolution kernel segment of the plurality of convolution kernel segments and a first convolution input data group among the convolution input data groups of a first convolution input data segment; and
- loading a second convolution input data group among the convolution input data groups of the first convolution input data segment into the input cache to replace the first convolution input data group after at least one convolutional processing element performs the sectioned convolution operation on the first convolution input data group and the first convolution kernel segment, so that the at least one convolutional processing element performs a sectioned convolution operation on the second convolution input data group and the first convolution kernel segment.

19. The method of claim 16, wherein a quantity of rows of a matrix corresponding to the sectioned convolution kernel and a quantity of columns of a matrix corresponding to the sectioned convolution input data are determined by a quantity of logic circuits of at least one convolutional processing element.

* * * * *